United States Patent
Runciman et al.

(10) Patent No.: US 11,585,911 B2
(45) Date of Patent: Feb. 21, 2023

(54) VARIABLE GEOMETRY SONAR SYSTEM AND METHOD

(71) Applicant: Klein Marine Systems, Inc., Salem, NH (US)

(72) Inventors: Peter Runciman, Exeter, NH (US); Giuseppe Distefano, Bedford, NH (US)

(73) Assignee: Klein Marine Systems, Inc., Salem, NH (US)

( * ) Notice: Subject to any disclaimer, the term of this patent is extended or adjusted under 35 U.S.C. 154(b) by 1022 days.

(21) Appl. No.: 16/294,795

(22) Filed: Mar. 6, 2019

(65) Prior Publication Data

US 2019/0331778 A1    Oct. 31, 2019

Related U.S. Application Data

(60) Provisional application No. 62/663,875, filed on Apr. 27, 2018.

(51) Int. Cl.
| | | |
|---|---|---|
| *G01S 7/521* | (2006.01) | |
| *G01S 15/89* | (2006.01) | |
| *B63G 8/00* | (2006.01) | |
| *B63G 8/39* | (2006.01) | |

(52) U.S. Cl.
CPC .............. *G01S 7/521* (2013.01); *B63G 8/001* (2013.01); *B63G 8/39* (2013.01); *G01S 15/8902* (2013.01); *B63G 2008/004* (2013.01)

(58) Field of Classification Search
CPC ....... G01S 7/521; G01S 15/8902; B63G 8/39; B63G 8/001; B63G 2008/004; B63B 2211/02
See application file for complete search history.

(56) References Cited

U.S. PATENT DOCUMENTS

| | | | |
|---|---|---|---|
| 4,199,746 A * | 4/1980 | Jones | G01S 15/8902 367/88 |
| 4,970,700 A | 11/1990 | Gilmour et al. | |
| 7,066,888 B2 * | 6/2006 | Abend | G01S 15/8981 600/454 |

(Continued)

FOREIGN PATENT DOCUMENTS

ES    2558356 B1    9/2016

OTHER PUBLICATIONS

Received from Mr. Alex Ivanov May 2016, "Beyond The Side Scan: Forward Angled-Beam Imaging Sonar."

(Continued)

*Primary Examiner* — Isam A Alsomiri
*Assistant Examiner* — Amie M Ndure
(74) *Attorney, Agent, or Firm* — Clements Bernard Walker; Christopher L. Bernard

(57) ABSTRACT

A sonar system and method enable performing angled-looking sonar (ALS) by emitting sonar waves in a forward and downward direction from sonar transducers located at an underwater vessel. The sonar waves may be received by sonar transducers located at the underwater vessel. Additionally, a variable geometry sonar system and method enable performing side scan sonar (SSS) and ALS by moving at least one sonar transducer to perform both SSS and ALS. The variable geometry sonar system may be used with an underwater vessel to perform mine countermeasure (MCM) missions by using ALS for a homing phase on a target.

19 Claims, 12 Drawing Sheets

(56) References Cited

U.S. PATENT DOCUMENTS

| | | | |
|---|---|---|---|
| 2005/0124885 A1* | 6/2005 | Abend | A61B 8/085 600/443 |
| 2010/0042389 A1* | 2/2010 | Farruggia | G02B 27/0006 134/184 |
| 2011/0226175 A1 | 9/2011 | Gosling | |
| 2014/0079287 A1 | 3/2014 | Daniell | |
| 2015/0136012 A1* | 5/2015 | Williams | B25J 9/08 901/1 |
| 2015/0217844 A1* | 8/2015 | Firkan | B63G 8/00 440/12.5 |
| 2016/0207602 A1* | 7/2016 | Clark | B63H 20/007 |
| 2016/0223659 A1 | 8/2016 | Thales | |
| 2017/0031022 A1 | 2/2017 | Ivanov | |
| 2017/0031023 A1 | 2/2017 | Ivanov | |
| 2018/0224544 A1* | 8/2018 | Ivanov | G10K 11/006 |

OTHER PUBLICATIONS

Dec. 8, 2021 Supplementary European Search Report issued in corresponding International Application No. 19841539.
International Search Report and Written Opinion; PCT/US2019/21040 dated Jan. 28, 2020.
Runciman, P., "IRAD 2016: Angle Looking Sonar—A Low Cost Nadir Imaging Solution," May 2016.
Gilmour, G.A., "Angle-Look Sonar," Westinghouse Electronic Corporation, undated, pp. 281-299.

\* cited by examiner

800 — METHOD FOR SONAR IMAGING

802
ACTUATING A PORT MECHANICAL TRANSDUCER AND A STARBOARD MECHANICAL TRANSDUCER TO MOVE FROM A FIRST POSITION TO A SECOND POSITION

804
CONTROLLING FIRST CIRCUITRY ENABLED TO DRIVE AT LEAST ONE OF THE PORT SONAR TRANSDUCER OR THE STARBOARD SONAR TRANSDUCER WITH A SONAR WAVEFORM TO INSONIFY A FIRST AREA THAT INCLUDES A NADIR OF THE VESSEL

806
CONTROLLING SECOND CIRCUITRY ENABLED TO RECEIVE, FROM THE PORT SONAR TRANSDUCER, A PORT SONAR ECHO SIGNAL INDICATIVE OF A PORT SONAR ECHO FROM THE FIRST AREA

808
CONTROLLING SECOND CIRCUITRY ENABLED TO RECEIVE, FROM THE STARBOARD SONAR TRANSDUCER, A STARBOARD SONAR ECHO SIGNAL INDICATIVE OF A STARBOARD SONAR ECHO FROM THE FIRST AREA

810
CONTROLLING SECOND CIRCUITRY ENABLED TO INTERPRET THE PORT SONAR ECHO SIGNAL AND THE STARBOARD SONAR ECHO SIGNAL TO GENERATE AN IMAGE OF THE FIRST AREA, WHERE THE PORT SONAR ECHO AND THE STARBOARD SONAR ECHO ARE REFLECTED FROM THE SONAR WAVEFORM AT THE FIRST AREA

FIG. 8

VARIABLE GEOMETRY SONAR SYSTEM AND METHOD

CROSS-REFERENCE TO RELATED APPLICATIONS

This application claims priority to U.S. Provisional Patent Application Ser. No. 62/663,875 filed on Apr. 27, 2018, titled "Angle Looking Sonar System and Method", which is incorporated herein by reference in its entirely.

BACKGROUND

Field of the Disclosure

The present disclosure relates generally to sonar technology and, more particularly, to a variable geometry sonar that enables angle looking sonar (ALS).

Description of the Related Art

Conventional side scan sonar (SSS) technology typically includes an underwater vessel having two sonar arrays projecting sound laterally, along with a receiving system recording an echo received in response to the projected sound. Typical SSS vessels may be a towed body, such as an unmanned, underwater vehicle (UUV), or may be an autonomous vessel with self-propulsion. The sonar arrays may be located on either side of the SSS vessel and may emit individual pings to generate the echo. The echo is typically recorded as waveform having a time series of sound samples. The waveform is usually displayed or visualized in a line, while successive SSS pings can generate additional lines that can be displayed using a waterfall plot, for example, to generate a sonar image of the underwater surroundings.

SSS technology may exhibit poor signal quality in a nadir area, defined as a region directly beneath the underwater vessel. The poor coverage of the nadir area below the underwater vessel by SSS can result in reduced survey efficiency, because additional scanning runs are involved to obtain complete coverage and because the additional scans may overlap, which is undesirable for wasting time and resources.

Conventional side looking sonar (SLS) is a sonar imaging technology that typically includes SSS and a synthetic aperture sonar (SAS). SLS works by accumulating successive traces from a sonar array that emits a narrow horizontal beam and a broad vertical beam projected from an underwater vessel. The successive traces may be obtained using range raster scanning. The beams in SLS are emitted in a perpendicular direction to the motion of the underwater vehicle. In this manner, SLS may obtain a continuous high resolution image of the sea bottom. The horizontal beam width may typically be emitted using an extended high frequency line-array oriented in the direction of motion of the underwater vessel. The advantages of SLS may include low drag (due to a small frontal cross-section of the underwater vessel), low power consumption, flexible sonar pay load configuration, and the generation of images with spatial resolution voxels of a few inches over a wide swath of operating range on either side of the vessel. Accordingly, SLS has been used for mine countermeasure (MCM) applications on UUVs.

Although both SSS and SLS are useful techniques, SSS and SLS may be inflexible due to a fixed geometric orientation of the sonar arrays used with respect to the UUV body.

SUMMARY

In one aspect, a first vessel for underwater sonar imaging is disclosed. The first vessel may include a vessel body having a longitudinal axis and having a port side and a starboard side. In the first vessel, the vessel body may be enabled to move underwater along the longitudinal axis. The first vessel may further include a port sonar transducer located on the port side, a starboard sonar transducer located on the starboard side. In the first vessel, the port sonar transducer and the starboard sonar transducer may be enabled to move from a first position to insonify a first direction to a second position to insonify a second direction different from the first direction.

In any of the implementations of the first vessel, the first direction may extend generally perpendicular to the longitudinal axis. In any of the implementations of the first vessel, the second direction may extend generally parallel to the longitudinal axis. In any of the implementations of the first vessel, the second direction may extend along a direction of motion of the vessel body. In any of the implementations of the first vessel, the first direction and the second direction may extend downwards at a declination angle with respect to the longitudinal axis. In any of the implementations of the first vessel, the declination angle may be selected from an angle between 30° to 60°. In any of the implementations of the first vessel, the second direction may extend at an azimuth angle with respect to the longitudinal axis. In any of the implementations of the first vessel, the azimuth angle may be selected from an angle between 25° to 45°.

In any of the implementations, the first vessel may further include a port mechanical transducer enabled to move the port sonar transducer from the first position to the second position, and a starboard mechanical transducer enabled to move the starboard sonar transducer from the first position to the second position. In any of the implementations of the first vessel, the port mechanical transducer and the starboard mechanical transducer may be spring-loaded mechanisms enabled to release from the first position to the second position. In any of the implementations of the first vessel, al least one of the port mechanical transducer or the starboard mechanical transducer may further include a hinge enabled to move from the first position to the second position.

In any of the implementations of the first vessel, the vessel may be an unmanned underwater vessel. In any of the implementations of the first vessel, the vessel may be a tow body.

In any of the implementations of the first vessel, the vessel may be enabled for autonomous operation.

In any of the implementations, the first vessel may further include first circuitry enabled to drive at least one of the port sonar transducer or the starboard sonar transducer with a sonar waveform to insonify a first area. The first vessel may further include second circuitry enabled to receive, from the port sonar transducer, a port sonar echo signal indicative of a port sonar echo from the first area, receive, from the starboard sonar transducer, a starboard sonar echo signal indicative of a starboard sonar echo from the first area, and interpret the port sonar echo signal and the starboard sonar echo signal to generate an image of the first area. In the first vessel, the port sonar echo and the starboard sonar echo may be reflected from the sonar waveform at the first area. In any of the implementations of the first vessel, the first area may include a nadir of the vessel.

In another aspect, a first method for mine countermeasure (MCM) operations is disclosed. The first method may include receiving instructions at an underwater vessel to perform an MCM mission. The instructions specifying an expected location of an MCM target. In the first method, the underwater vessel may further include a vessel body having a longitudinal axis and having a port side and a starboard side. In the first method, the vessel body may be enabled to move underwater along the longitudinal axis. In the first method, the underwater vessel may further include a port sonar transducer located on the port side, a starboard sonar transducer located on the starboard side. In the first method, the port sonar transducer and the starboard sonar transducer may be enabled to move from a first position to insonify a first direction to a second position to insonify a second direction different from the first direction. Responsive to the underwater vessel being deployed underwater to perform the MCM mission, the first method may further include, performing an initial phase of the MCM mission including scanning a water body floor in vicinity of the expected location using the port sonar transducer and the starboard sonar transducer in the first position to generate first sonar images. In the first method, the first direction may be respectively perpendicular lo the vessel body. Based on the first sonar images, the first method may further include determining an actual location of the MCM target, and performing a homing phase of the MCM mission including scanning the water body floor in vicinity of the actual location using the port sonar transducer and the starboard sonar transducer in the second position lo generate second sonar images. In the first method, the second direction may be respectively parallel to the vessel body. Based on the second sonar images, the first method may further include neutralizing the MCM target.

In any of the implementations, the first method may further include, prior to neutralizing the MCM target, releasing at least one of the port sonar transducer or the starboard sonar transducer from the underwater vessel. In any of the implementations of the first method, neutralizing the MCM target may further include detonating an explosive charge. In the first method, the explosive charge may be included with the underwater vessel. In any of the implementations of the first method, the explosive charge may be included with the MCM target. In any of the implementations of the first method, the second sonar images may have higher spatial resolution than the first sonar images.

In any of the implementations of the first method, the underwater vessel may be remotely operated. In any of the implementations of the first method, the underwater vessel may be enabled for autonomous operation. In any of the implementations of the first method, the underwater vessel may be remotely monitored.

In any of the implementations of the first method, performing the homing phase may further include mechanically actuating the port sonar transducer and the starboard sonar transducer to move from the first position to the second position.

In still a further aspect, a controller for underwater sonar imaging implemented in a vessel is disclosed. The vessel in which the controller is implemented may further include a vessel body having a longitudinal axis and having a port side and a starboard side, such that the vessel body is enabled to move underwater along the longitudinal axis. The vessel in which the controller is implemented may further include a port sonar transducer located on the port side, a starboard sonar transducer located on the starboard side. In the vessel in which the controller is implemented, the port sonar transducer and the starboard sonar transducer may be enabled to move from a first position to insonify a first direction to a second position to insonify a second direction different from the first direction. The controller may include a processor having access to a memory media storing instructions executable by the processor. In the controller, the instructions may be executable for controlling first circuitry enabled to drive at least one of the port sonar transducer or the starboard sonar transducer with a sonar waveform to insonify a first area comprising a nadir of the vessel, and controlling second circuitry. In the controller, the second circuitry may be enabled for receiving, from the port sonar transducer, a port sonar echo signal indicative of a port sonar echo from the first area, receiving, from the starboard sonar transducer, a starboard sonar echo signal indicative of a starboard sonar echo from the first area, and interpreting the port sonar echo signal and the starboard sonar echo signal to generate an image of the first area. In the controller, the port sonar echo and the starboard sonar echo may be reflected from the sonar waveform at the first area.

In any of the implementations of the controller, the first direction may extend about perpendicular to the longitudinal axis. In any of the implementations of the controller, the second direction may extend about parallel to the longitudinal axis. In any of the implementations of the controller, the second direction may extend along a direction of motion of the vessel body. In any of the implementations of the controller, the first direction and the second direction may extend downwards at a declination angle with respect to the longitudinal axis. In any of the implementations of the controller, the declination angle may be selected from an angle between 30° to 60°. In any of the implementations of the controller, the second direction may extend at an azimuth angle with respect to the longitudinal axis. In any of the implementations of the controller, the azimuth angle may be selected from an angle between 25° to 45°.

In any of the implementations, the controller may further include a port mechanical transducer enabled to move the port sonar transducer from the first position to the second position, and a starboard mechanical transducer enabled to move the starboard sonar transducer from the first position to the second position, while the controller may further include instructions for actuating the port mechanical transducer and the starboard mechanical transducer.

In any of the implementations of the controller, the port mechanical transducer and the starboard mechanical transducer may be spring-loaded mechanisms enabled to release from the first position to the second position. In any of the implementations of the controller, at least one of the port mechanical transducer or the starboard mechanical transducer may further include a hinge enabled to move from the first position to the second position.

In yet another aspect, a second vessel for underwater sonar imaging is disclosed. The second vessel may include a vessel body having a longitudinal axis and having a nosecone and at least two tailfins, including a port tailfin and a starboard tailfin. In the second vessel, the vessel body may be enabled to move underwater along the longitudinal axis. The second vessel may further include a port sonar transducer located at the nosecone, a starboard sonar transducer located at the nosecone, a port tailfin sonar transducer located at the port tailfin, a starboard tailfin sonar transducer located at the starboard tailfin. In the second vessel, the port sonar transducer and the starboard sonar transducer may be enabled to insonify a downward direction with respect to the vessel body. In the second vessel, the port tailfin sonar transducer may be enabled to receive a port sonar echo from the port sonar transducer. In the second vessel, the starboard tailfin sonar transducer may be enabled to receive a starboard sonar echo from the starboard sonar transducer.

In any of the implementations of the second vessel, the downward direction may extend below and ahead of the vessel body. In any of the implementations of the second vessel, the downward direction may extend downwards at a declination angle with respect to the longitudinal axis. In any of the implementations of the second vessel, the declination angle may be selected from an angle between 30° to 60°.

In any of the implementations, the second vessel may further include a port side sonar transducer located at the port side, and a starboard side sonar transducer located at the starboard side.

In any of the implementations of the second vessel, the vessel may be an unmanned underwater vessel. In any of the implementations of the second vessel, the vessel may be a tow body. In any of the implementations of the second vessel, the vessel may be enabled for autonomous operation.

In any of the implementations, the second vessel may further include first circuitry enabled to drive at least one of the port sonar transducer or the starboard sonar transducer with a sonar waveform to insonify a first area. The second vessel may further include second circuitry enabled for receiving, from the port tailfin sonar transducer, a port sonar echo signal indicative of the port sonar echo from the first area, receiving, from the starboard sonar transducer, a starboard sonar echo signal indicative of the starboard sonar echo from the first area, and interpreting the port sonar echo signal and the starboard sonar echo signal to generate an image of the first area. In the second vessel, the port sonar echo and the starboard sonar echo may be reflected from the sonar waveform at the first area.

In still another aspect, a third vessel for underwater sonar imaging is disclosed. The third vessel may include a vessel body having a longitudinal axis and a nosecone. In the third vessel, the vessel body may be enabled to move underwater along the longitudinal axis. The third vessel may further include a first sonar transducer located at the nosecone, a second sonar transducer located at the nosecone. In the third vessel, the first sonar transducer and the second sonar transducer may be enabled to insonify a downward direction with respect to the vessel body.

In any of the implementations of the third vessel, the first sonar transducer and the second sonar transducer may be segmented transducers that include a plurality of individual sonar channels. In any of the implementations of the third vessel, the first sonar transducer and the second sonar transducer may be oriented along a curve having a focal point corresponding to a radius of the curve.

In any of the implementations of the third vessel, the first sonar transducer and the second sonar transducer may be exposed at the nosecone. In any of the implementations of the third vessel, the first sonar transducer and the second sonar transducer may be located infernal to the nosecone. In the third vessel, the nosecone may further include a cover enabled to transmit sonar waves.

In any of the implementations of the third vessel, the first sonar transducer and the second sonar transducer may be oriented perpendicular to each other. In the third vessel, the first sonar transducer and the second sonar transducer may be oriented at an angle between 80° and 100° with respect to each other.

In any of the implementations of the third vessel, the nosecone may further include a first V-shaped channel containing the first sonar transducer and a second V-shaped channel containing the second sonar transducer. In any of the implementations of the third vessel, the first V-shaped channel and the second V-shaped channel may be enabled to direct sonar waves respectively emitted by the first sonar transducer and the second sonar transducer.

In any of the implementations, the third vessel may further include at least two fins, including a port fin and a starboard fin, a port fin sonar transducer located at the port fin, and a starboard fin sonar transducer located al the starboard fin. In any of the implementations of the third vessel, the port fin sonar transducer may be enabled to receive a first sonar echo from the first sonar transducer, and the starboard fin sonar transducer may be enabled to receive a first sonar echo originating from the second sonar transducer.

In any of the implementations, the third vessel may further include a port side sonar transducer located at a port side, and a starboard side sonar transducer located at a starboard side.

In any of the implementations, the third vessel may further include first circuitry enabled to drive at least one of the first sonar transducer or the second sonar transducer with a sonar waveform to insonify a first area, and second circuitry enabled to receive, from the port fin sonar transducer, a port sonar echo signal indicative of the port sonar echo from the first area, receive, from the starboard sonar transducer, a starboard sonar echo signal indicative of the starboard sonar echo from the first area, and interpret the port sonar echo signal and the starboard sonar echo signal to generate an image of the first area. In the third vessel, the port sonar echo and the starboard sonar echo may be reflected from the sonar waveform at the first area.

In any of the implementations of the third vessel, the vessel may be an unmanned underwater vessel. In any of the implementations of the third vessel, the vessel may be a tow body. In any of the implementations of the third vessel, the vessel may be enabled for autonomous operation.

In still another aspect, a fourth vessel for underwater sonar imaging is disclosed. The fourth vessel may include a vessel body having a longitudinal axis and a sidefin. In the fourth vessel, the vessel body may be enabled to move underwater along the longitudinal axis. The fourth vessel may further include a first sonar transducer located at the sidefin. In the fourth vessel, the first sonar transducer may be enabled to insonify a downward direction with respect lo the vessel body.

In any of the implementations of the fourth vessel, the first sonar transducer may be a segmented transducer that includes a plurality of individual sonar channels. In any of the implementations of the fourth vessel, the first sonar transducer may be oriented along a curve having a focal point corresponding to a radius of the curve.

In any of the implementations of the fourth vessel, the first sonar transducer may be exposed at the sidefin.

In any of the implementations, the fourth vessel may further include a second sidefin located at a different position along the longitudinal axis, and a second sonar transducer located at the second sidefin.

In any of the implementations of the fourth vessel, the second sonar transducer may be enabled to receive a sonar echo originating from the first sonar transducer.

In any of the implementations, the fourth vessel may further include a port side sonar transducer located at a port side, and a starboard side sonar transducer located at a starboard side.

In any of the implementations, the fourth vessel may further include first circuitry enabled to drive the first sonar transducer with a sonar waveform to insonify a first area. In the fourth vessel, the sonar waveform may creates the sonar echo. The fourth vessel may further include second circuitry enabled to receive, from the second sonar transducer, a sonar echo signal indicative of the sonar echo, and interpret the sonar echo signal to generate an image of the first area, while the sonar echo is reflected from the sonar waveform at the first area.

In any of the implementations of the fourth vessel, the vessel may be an unmanned underwater vessel. In any of the implementations of the fourth vessel, the vessel may be a tow body. In any of the implementations of the fourth vessel, the vessel may be enabled for autonomous operation.

BRIEF DESCRIPTION OF THE DRAWINGS

For a more complete understanding of the present invention and its features and advantages, reference is now made to the following description, taken in conjunction with the accompanying drawings, in which:

FIG. 8 is a flow chart depicting a method for sonar imaging:

DESCRIPTION Of PARTICULAR EMBODIMENT(S)

Figure 1:
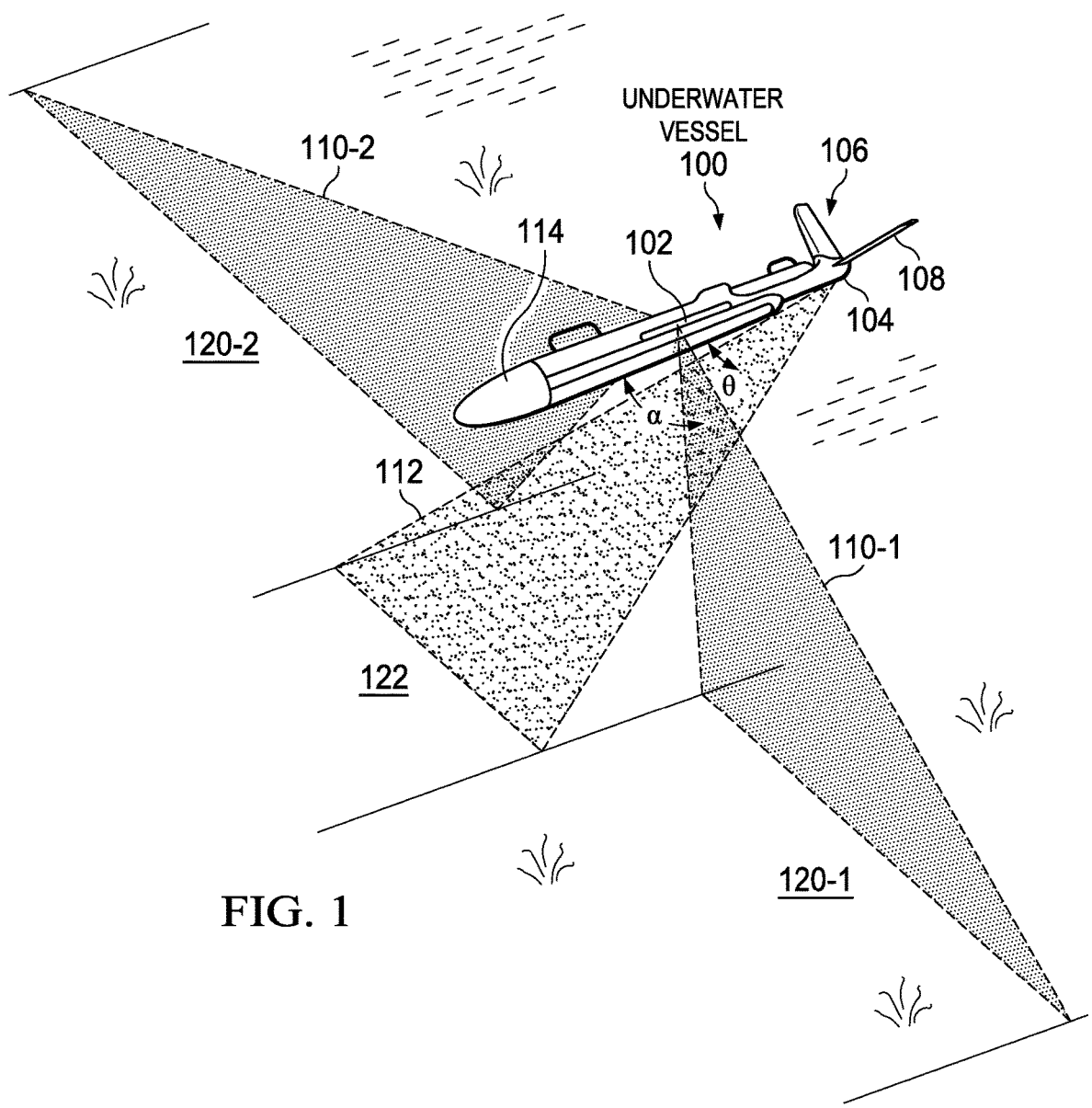
FIG. 1 is a depiction of a vessel having a combination of SSS and ALS sonar arrays.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the unhyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

As noted, both SSS and SLS are useful techniques, but SSS and SLS may be constrained to certain functionality due to a fixed geometric orientation of the sonar arrays with respect to the UUV body.

In one operational example, an UUV may perform a MCM UUV survey and may operate at 800-900 kHz (or another frequency range) by moving in a pattern to cover an area of the sea bed. The pattern may be similar to that used when performing a lawn treatment or an agricultural treatment lo a larger area by using a smaller size piece of equipment, such as in rows or by tracing certain pathways over the larger area. The MCM UUV survey may be performed at a velocity of 3 knots and an altitude of about 5 m from the sea floor. The low altitude above the sea floor may enable grazing angle insonification that optimizes sonar imaging performance, thereby allowing detection classification at distances of up to 75 m per side, with a 150 m total swath coverage. The UUV may be enabled to identify targets from the sonar imagery and specific positions of targets that may be noted for further identification and neutralization. The position of the target may be programmed on the UUV, which can include instructions for a homing phase into the target for final disposal. In certain instances, the UUV may experience underwater navigation issues (e.g., drift, currents, etc.), loss of sensor accuracy, and sensor fusion issues that may introduce errors in the bearing of the UUV with respect to the target. For this reason the final homing phase may be aided by using an optical camera based guidance system that may be remotely controlled or autonomous. However, when the UUV operates in poor water transparency conditions or when insufficient light is present, optical cameras may be ineffective for improving guidance.

To overcome such homing phase issues, mine actuation or neutralization for MCM carried out by a small UUV may entail two phases executed in sequence in a single deployment of the UUV. In a first phase, lite target may be reacquired or relocated. In a second phase (i.e., the homing phase), the UUV may perform a homing run to the target. As MCM operations move towards operations involving UUV-based SLS sensors, the positional accuracy errors involved with acquiring a target may increase due to the navigational challenges of submerged vehicles. The navigational challenges may result in target localization uncertainties, which, combined with poor water transparency, may involve underwater distances beyond the range of optical-cameras. Using a fixed forward-looking sonar, such as on a nosecone of the UUV, to locate or confirm the location of the target may improve the underwater range, but may still exhibit poor spatial resolution due to the small diameter of the UUV that constrains the size of the sonar array in the nosecone.

A small, conventional UUV with SSS operating over a 25 m range scale at nominally 900 kHz may provide spatial resolution the same or better than the first phase MCM UUV survey. The SSS spatial imaging resolution in this example is expected to be nominally 10-15 cm along-track and 3 cm across-track. The image from the homing phase reacquisition SSS may have similar characteristics to the first phase image, because both the first phase image and the homing phase image are generated from grazing-angle incidence sonar systems used for SSS that have high contrast and well defined shadow areas and insonified areas. The similarity of the UUV with SSS imaging to the first phase imaging may enable autonomous (operator-independent, untethered) mission capability for a reacquisition phase. The SSS array, being mounted on the side of the UUV body, provides low hydrodynamic drag to the vehicle which can be important for propulsion efficiency over a long transition distance from the standoff deployment to the target.

In contrast, a variable geometry sonar that enables ALS, as disclosed herein, may enable the positioning of sonar arrays on a vessel relative to the vessel body, in order to direct sonar pings to a desired scan area. In particular, the variable geometry sonar that enables ALS disclosed herein may involve physically mounting or orienting sonar arrays at an angle to the vessel body. Each sonar array may emit a fan-beam of acoustic energy when a ping is generated by the sonar array. In the variable geometry sonar that enables ALS, each fan-beam from the sonar array may be oriented underneath and at a forward grazing angle with respect to the vessel body and motion of the vessel. Accordingly, the variable geometry sonar system that enables ALS disclosed herein may include one or more single beam side scan line-arrays, such as those commercially available from Klein Marine Systems.

In other embodiments, the variable geometry sonar system that enables ALS disclosed herein may include segmented sonar arrays, such as multichannel arrays with individual elements that produce a respective individual signal. The segmented multichannel sonar arrays may be enabled for tuning or directionality using phase modulation techniques. In some embodiments, the segmented multichannel sonar arrays may be arranged in an arc to perfectly coincide with a sonic local point distance, with the radius of the arc defined by the sonic focal point distance.

In various embodiments, the variable geometry sonar system that enables ALS disclosed herein may include one or more sonar arrays mounted on a port side and on a starboard side of the vessel. For example, the sonar array of the variable geometry sonar system that enables ALS disclosed herein may be mounted or positioned al a given forward angle (in azimuth) and at a given downward angle (in declination). The sonar arrays in the variable geometry sonar system that enables ALS disclosed herein arranged in this manner may provide an acoustic track over the sea bottom with an insonified area that starts from the port side and extends diagonally forwards across the nadir of the vessel to the starboard side ahead of the vessel. In some implementations of the variable geometry sonar system that enables ALS disclosed herein, the sonar arrays may be located on an exterior surface of the vessel. In other implementations of the variable geometry sonar system that enables ALS disclosed herein, the sonar arrays may be located within the vessel body. Furthermore, it is noted that, in the variable geometry sonar system that enables ALS disclosed herein, the sonar arrays may be single beam SSS arrays or may be multi-beam sonar arrays, in various embodiments.

An underwater vessel having the variable geometry sonar system that enables ALS disclosed herein can be provided in various embodiments, including embodiments that can be implemented al a relatively low cost, embodiments having relatively low power consumption, and embodiments having relatively small external dimensions, such as a relatively small external diameter. The variable geometry sonar system that enables ALS disclosed herein may provide a unified sonar platform for target acquisition, for homing phase imaging, and for navigation. In particular, the variable geometry sonar system that enables ALS disclosed herein may support relatively high resolution sonar imaging that is suitable for MCM operations, as well as providing enhanced resolution for other applications. The variable geometry sonar system that enables ALS disclosed herein enables both SSS and ALS to be performed on a single vessel, by providing a mechanical re-orientation of sonar transducers for both SSS and ALS, along with the corresponding signal processing functionality to switch between processing sonar echoes for both SSS and ALS. The variable geometry sonar system that enables ALS disclosed herein may accordingly enable cost reduction for mine actuation, neutralization, among other MCM missions.

As will be described in further detail herein, systems and methods for a variable geometry sonar system that enables ALS based on a variable geometry sonar array are disclosed. The systems and methods for a variable geometry sonar system that enables ALS disclosed herein may be combined with conventional SSS arrays. The systems and methods for a variable geometry sonar system that enables ALS disclosed herein may be implemented in a UUV or another vessel suitable for having a variable geometry sonar.

Turning now to the drawings, FIG. 1 illustrates an underwater vessel 100 having a combination of sonar arrays. In various embodiments, underwater vessel 100 may be self-propelled or may be used as a tow body. Underwater vessel 100 may also be a UUV. Specifically, underwater vessel 100 is shown including a sonar array 102 that functions as an SSS and a sonar array 104 that functions as an ALS. Sonar arrays 104 for ALS are located proximal to the stem of underwater vessel 100, such as below a tailfin section 106 of underwater vessel 100. The sonar arrays 102 for SSS are shown in FIG. 1 located in a middle portion on the port side and the starboard side of underwater vessel 100. It is noted that various different geometries and locations for sonar arrays 102 and 104 may be used in various embodiments.

In FIG. 1, sonar arrays 102 for SSS may be used to insonify regions below and to the sides of underwater vessel 100. Specifically, on underwater vessel 100, a first SSS beam 110-1 insonifies a region 120-1 extending below and outwards on the port side, while a second SSS beam 110-2 insonifies a region 120-2 extending below and outwards on the port side. An azimuth angle α is defined as the angle between SSS beam 110 and the vessel body (or the forward direction of underwater vessel 100). It is noted that the azimuth angle α may be roughly perpendicular to a sonar emitting surface of SSS 102. Also, on underwater vessel 100, an ALS beam 112 insonifies an area 122 that includes a nadir of underwater vessel 100 in a forward direction. An inclination angle θ is defined as the angle between ALS beam 112 and the vessel body (or horizontal). For example, α may be about 60° while θ may be about 45° in some embodiments.

The sonar arrays 102 for SSS or sonar arrays 104 for ALS on underwater vessel 100 may be mounted in various locations with different arrangements, in addition to or alternatively from the locations described above. In some implementations, a sonar array may be mounted at various locations in tailfin section 106, such as on a tailfin 108. In particular, a lower tailfin on underwater vessel 100 may be used for installing a sonar array to insonify the sea bed. In some implementations, a sonar array may be mounted within a nosecone 114 of underwater vessel 100. Nosecone 114 may include an acoustically transparent cover that protects and enables a sonar array to be housed in nosecone 114. Various other types of underwater vessels or tow bodies may be used in other embodiments, including as described in further detail below.

Figure 2:
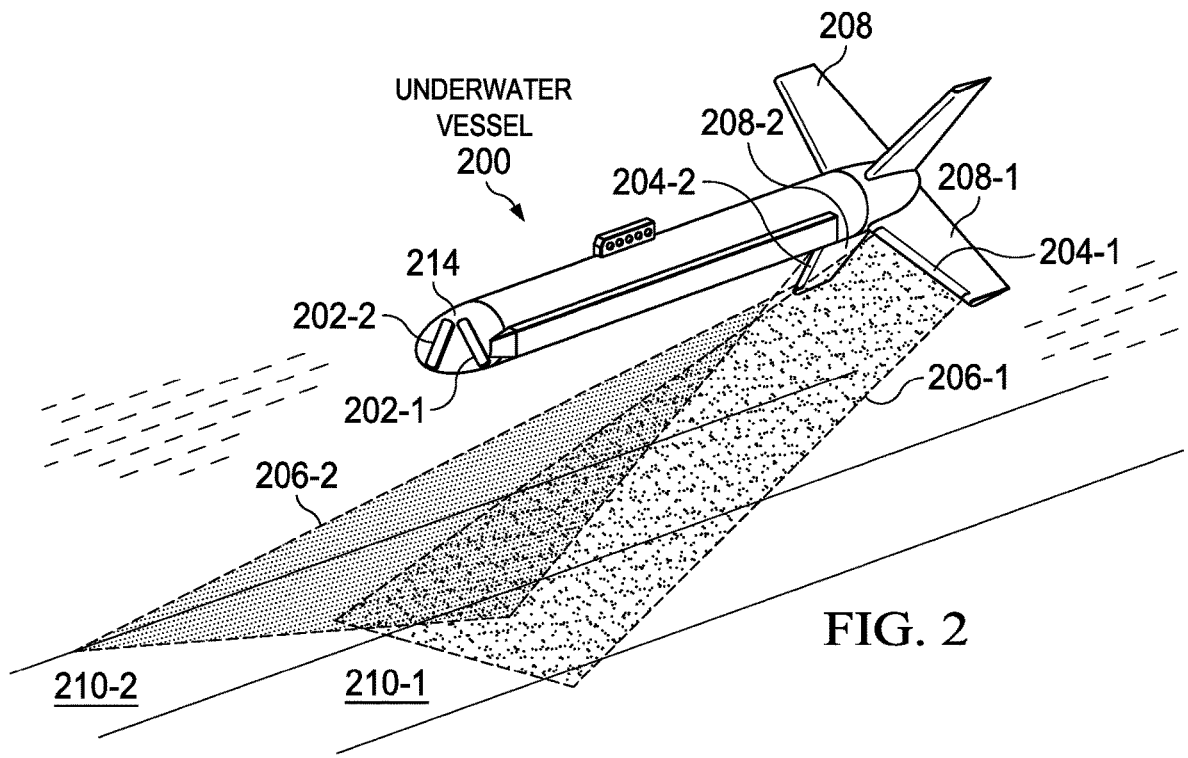
FIG. 2 is a depiction of a vessel having sonar arrays on a port tin and a starboard fin.

FIG. 2 illustrates an underwater vessel 200 having a combination of sonar arrays. In various embodiments, underwater vessel 200 may be self-propelled or may be used as a tow body. Underwater vessel 200 may also be a UUV. Specifically, underwater vessel 200 is shown including a first sonar array 202 that is located at a nosecone 214 of underwater vessel 200. Also shown in FIG. 2 is a second sonar array 204 that can be located on at least one tailfin 208 of underwater body 200. Specifically, second sonar array 204 is shown comprising second sonar array 204-1 on a port-side tailfin 208-1 and second sonar array 204-1 on a starboard side tailfin 208-1.

In FIG. 2, when second sonar array 204 is used as a transmitter, second sonar array 204-1 generates a port beam 206-1, while second sonar array 204-2 generates a starboard beam 206-2. When second sonar array 204 is used as a transmitter, first sonar array 202 may be used as a receiver, since port beam 206-1 and starboard beam 206-2 are projected forwards to an area 210 that includes the nadir of underwater vessel 200. Also, as shown, first sonar array 202 is comprised of first sonar array 202-1 that may receive echoes from port beam 206-1 reflected from area 210-1 and first sonar array 202-2 that may receive echoes from starboard beam 206-2 reflected from area 210-2.

Figure 3:
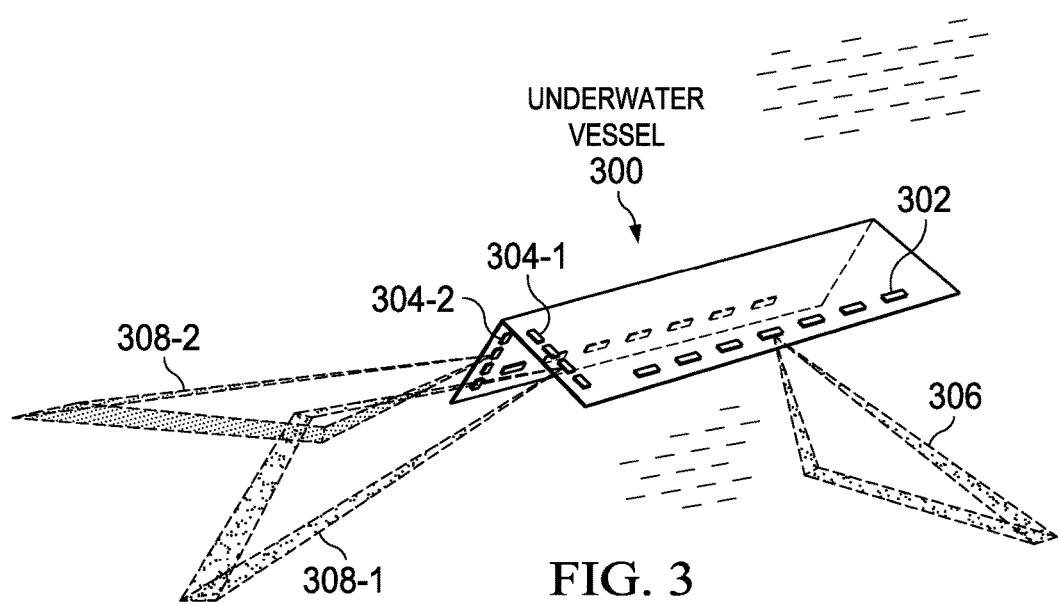
FIG. 3 is a depiction of a manta-shaped structure having sonar arrays on port and starboard sides.

FIG. 3 illustrates an underwater vessel 300 having a combination of sonar arrays. In FIG. 3, underwater vessel 300 is shown as a mania-shaped structure that may form the body of underwater vessel 300. In various embodiments, underwater vessel 300 may be self-propelled or may be used as a tow body. Underwater vessel 300 may also be a UUV. Specifically, underwater vessel 300 is shown including sonar arrays 302 for SSS, as well as sonar arrays 304 for ALS. Because of the mania-shaped structure of underwater vessel 300, sonar arrays 302 for SSS and sonar arrays 304 for ALS may be duplicated on each side (or wing) of underwater vessel 300 to have port side and starboard side insonification. Specifically, a port SSS beam 306 may be emitted from sonar arrays 302 for SSS from the port side, as shown in FIG. 3. The starboard side in FIG. 3 is obscured from view but it will be understood that sonar arrays 302 for SSS may emit a corresponding starboard side beam from the starboard side of underwater vessel 300. Also visible in FIG. 3 are a port ALS beam 308-1 emitted from sonar arrays 304-1 for ALS, along with a starboard ALS beam 308-2 emitted from sonar arrays 304-2 for ALS. In FIG. 3, sonar arrays 302 for SSS and sonar arrays 304 for ALS may be located at an underside surface of underwater vessel 300, in order to directly insonify the sea bottom.

Figure 4A:
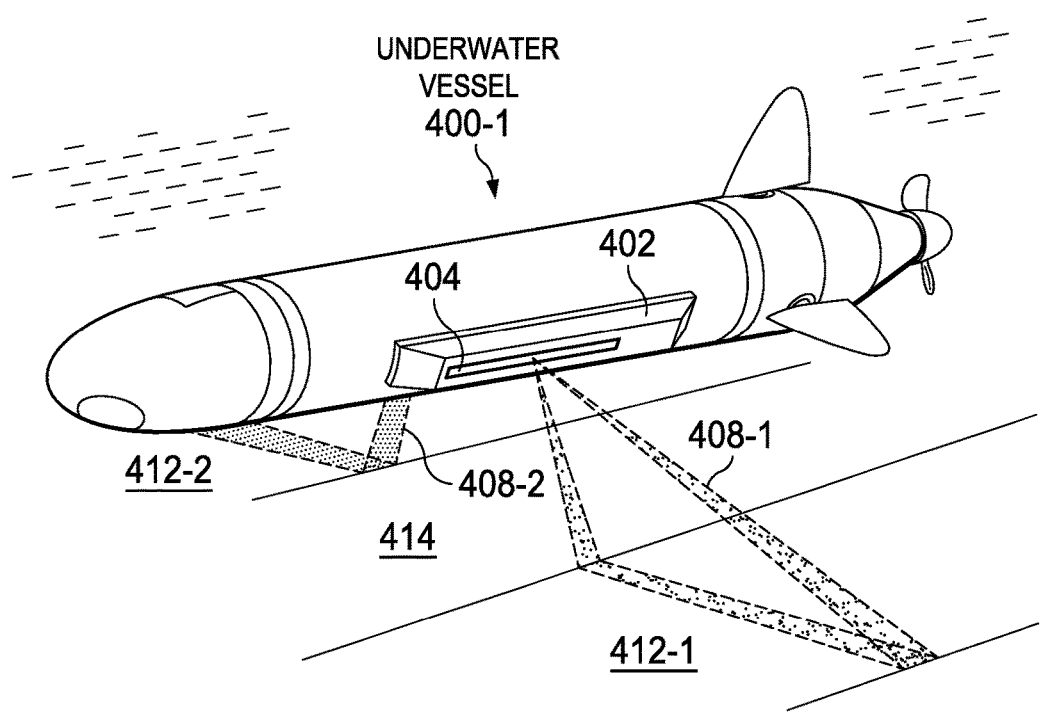
FIGS. 4A and 4B are depictions of a vessel having a variable geometry sonar array.
Figure 4B:
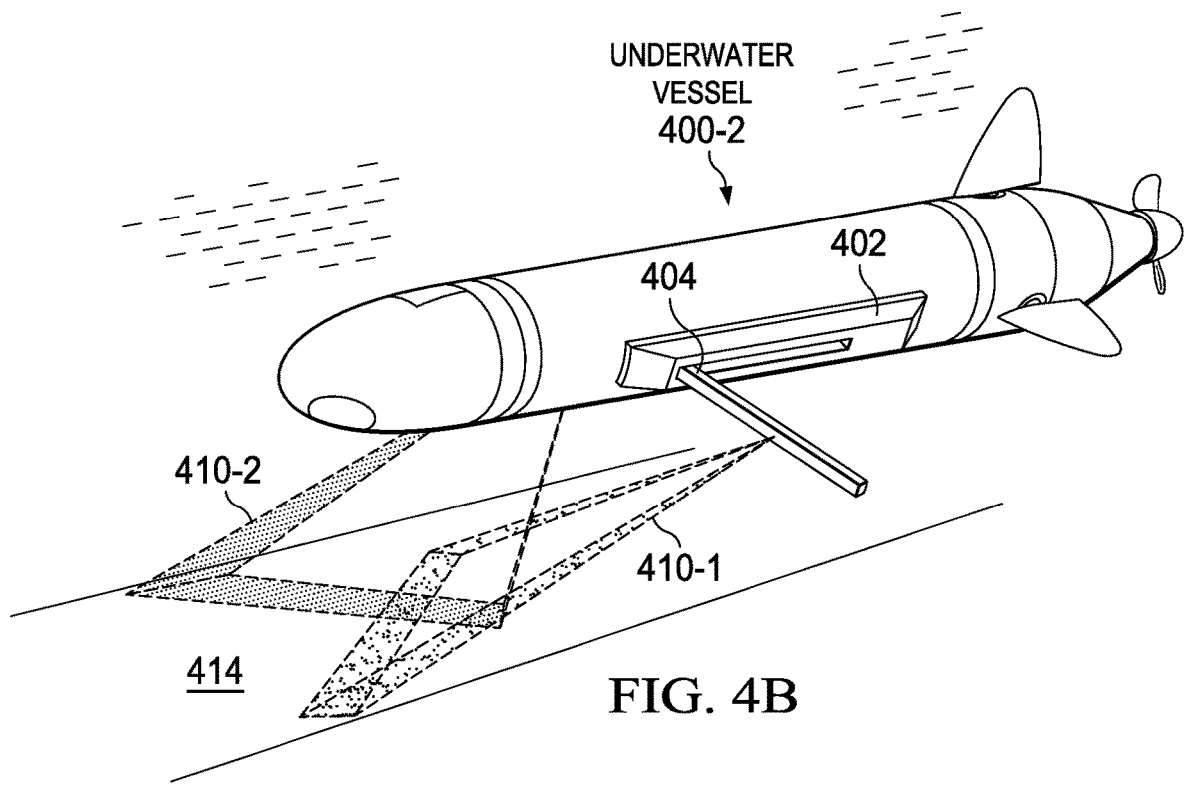

FIGS. 4A and 4B illustrate an underwater vessel 400 with a variable geometry sonar 402 that is enabled for SSS and for ALS. Underwater vessel 400 is depicted in a first configuration as underwater vessel 400-1 in FIG. 4A and in a second configuration as underwater vessel 400-2 in FIG. 4B. In various embodiments, underwater vessel 400 may be self-propelled or may be used as a tow body. Underwater vessel 400 may also be a UUV.

In FIGS. 4A and 4B, underwater vessel 400 is shown having variable geometry sonar 402 on both the port side and the starboard side, with the starboard side of underwater vessel 400 being obscured from view for descriptive purposes. Variable geometry sonar 402 further includes a sonar transducer 404, which is shown hingeably attached at one end to underwater vessel 400 to enable sonar transducer 404 operate with different azimuth angles α, such as by being rotated about the hingeably attached one end. Accordingly, variable geometry sonar 402 may include one or more mechanical actuators that enable positioning of sonar transducer 404. In the first configuration of underwater vessel 400-1 in FIG. 4A, variable geometry sonar 402 is depicted in a first position for u first mode of operation, which corresponds to SSS. Specifically, in underwater vessel 400-1, sonar transducer 404 is shown retracted and is roughly parallel with the side surface of underwater vessel 400-1. In the first configuration of underwater vessel 400-1 in FIG. 4A, azimuth angle α may be about 90° with respect to underwater vessel 400, such that a port SSS beam 408-1 is emitted about perpendicular at the port side of underwater vessel 400, while a starboard SSS beam 408-2 is emitted about perpendicular at the starboard side of underwater vessel 400 (as noted the starboard side variable geometry sonar 402 itself is obscured from view in FIG. 4A). As shown, port beam 408-1 insonifies a region 412-1, while starboard beam 408-2 insonifies a region 412-2.

In the second configuration of underwater vessel 400-2 in FIG. 4B, variable geometry sonar 402 is depicted in a second position for a second mode of operation, which corresponds to ALS. Specifically, in underwater vessel 400-2, sonar transducer 404 is shown extended to be approximately perpendicular with the outer surface of underwater vessel 400-2. In the second configuration of underwater vessel 400-2 in FIG. 4B, azimuth angle α may be about 0° with respect to underwater vessel 400, such that a port ALS beam 410-1 is emitted in the forward direction at the port side of underwater vessel 400, while a starboard ALS beam 410-2 is emitted in the forward direction at the starboard side of underwater vessel 400 to insonify an area that comprises nadir 414 (as noted the starboard side variable geometry sonar 402 itself is obscured from view in FIG. 4B). It is noted that the azimuth angle α may describe an average or overall direction of a sonar beam that may be emitted over a non-zero solid angle, for example to insonify a particular area corresponding to a beam width of the sonar beam.

In FIGS. 4A and 4B, a position of sonar transducer 404, such as an amount of rotation of sonar transducer 404 with respect to underwater vessel 400, may be preselected or may be determined in response to a control signal received at underwater vessel 400. For example, the position of sonar transducer 404 may be mechanically preset when underwater vessel 400 is used. In other embodiments, underwater vessel 400 may be in communication with a remote controller or an operator (not shown) and may receive information in operation accordingly to autonomously adjust the position of sonar transducer 404. It is noted that the port side variable geometry sonar 402 and the starboard side variable geometry sonar 402 of underwater vessel 400 may be independently operated, as desired, such as with respect to the position of respective sonar transducer 404 or a resulting directionality of the emitted sonar beam. In addition to controlling the geometry of variable geometry sonar 402 by controlling the position of sonar transducer 404, the signal processing and image transformations applied to the sonar imaging signals received by sonar transducer 404 may be correlated or adapted to the actual azimuth angle α and the declination angle θ being used, in order to provide accurate imaging of the sea bed over a desired area. In particular, the signal processing and image transformations used are enabled to combine sonar imaging signals from either or both SSS and ALS configurations.

As noted, underwater vessel 400 shown in FIGS. 4A and 4B, may be a self-powered, self-propelled vessel, and may further include means to perform at least certain portions of the signal processing and image transformations involved with sonar scanning and imaging. For example, underwater vessel 400 may include an onboard processor coupled to an onboard memory that stores instructions executable by the processor. The instructions may represent software or code to perform at least certain portions of the signal processing and image transformations involved with sonar scanning and imaging (see also FIG. 6, sonar controller 614). In addition, underwater vessel 400 may include one or more communication transceivers, which may be acoustic or electromagnetic transceivers, to enable underwater vessel 400 to communicate externally, such as with the remote controller or the operator, when present. In this manner, underwater vessel 400 may be enabled to receive information while in operation, such as data, command instructions, sonar configuration parameters, sonar imaging parameters, among other information. Accordingly, underwater vessel 400 may also lie enabled to transmit information while in operation, such as sonar imaging signals corresponding to the bottom of the water body in which underwater vessel 400 is deployed. In particular implementations, underwater vessel 400 may further comprise an input means to allow a user to pre-program underwater vessel 400 with desired control information, such as OPS coordinates specifying a region of interest or a potential target. The input means included with underwater vessel 400 may include one or more of a touch pad, a keypad, a keyboard, a touch display, or a bus interface, such as a universal serial bus (USB) interface enabled to receive a storage device or a communication device, among other input means that may allow external access to the processor and the memory of underwater vessel 400.

For example, in a remote controlled mode of operation, underwater vessel 400 may be remotely controlled by an operator in communication with underwater vessel 400, such as from a ship m the water body or from a terrestrial location, using the communication transceivers described above. In the remote controlled mode of operation of underwater vessel 400, various aspects of underwater vessel 400 and variable geometry sonar 402 may be under the control of the operator, such as navigation, motion, speed, direction, and depth of underwater vessel 400, as well as a mode of operation and a geometrical position of sonar transducer 404 (i.e., to determine the azimuth angle α). It is noted that the remote controlled mode of operation may be used when underwater vessel 400 is either self-propelled or is a tow body.

In another example, in an autonomous mode of operation, underwater vessel 400 may be programmed in advance with command instructions, such as GPS coordinates and a patrol purpose (i.e., a mission). The command instructions may be entered by a user into the memory of underwater vessel 400 and may be executable by the processor. Once released into the water body, underwater vessel 400 may operate autonomously and automatically, according to the command instructions received. It is noted that underwater vessel 400 may be programmed for various functionality and to perform different types of underwater missions. The underwater missions that underwater vessel 400 may be enabled to perform in the autonomous mode of operation may include MCM, sea bed surveillance, target identification, target homing, and target interception, among other types of missions.

It will be understood that in particular implementations, various combinations of the remote controlled and autonomous modes of operation of underwater vessel 400 may be used. For example, underwater vessel 400 may be operated in a semi-autonomous or semi-remote controlled manner, as desired. In various embodiments, underwater vessel 400 may be implemented as a disposable or single-use UUV and may be mechanically configured for a predetermined mission, in order to reduce cost by constraining the ability of underwater vessel 400 to be variously configured.

In various modes of operation and in various configurations, underwater vessel 400 may perform different missions using variable geometry sonar 402. In one example, underwater vessel 400 may be enabled to perform homing guidance for a target. Specifically, when underwater vessel 400 has localized the target, underwater vessel 400 may turn back and start a homing run. Then, underwater vessel 400 may re-orient variable geometry sonar 402 from an SSS configuration (i.e., with the azimuth angle α at about 90°) as illustrated in FIG. 4A, to an ALS configuration ((i.e., with the azimuth angle α at about 0°), such as illustrated in FIG. 4B.

In one embodiment, sonar transducer 404 may be hingeably attached at a forward end to the body of underwater vessel 400. In this arrangement, sonar transducer 404 may be movable to a first ALS con figuration, such as to the azimuth angle α of about 30° along with the declination angle θ of about 45° (which may be the same declination angle used with the SSS configuration). Sonar transducer 404 may further be movable to a second ALS configuration, such as to a range of azimuth angle α between about 25° and about 45° along with declination angle θ in a range of about 30° to about 60°.

In underwater vessel 400, the mechanical actuation of sonar transducer 404 to move from one position to another position may be implemented using various mechanisms. In one embodiment, a spring-loaded mechanism may be used and may enable release from a first position (SSS) to a second position (ALS). such as with a mechanical trigger. In some embodiments, a plurality of discrete positions of sonar transducers 404 may be mechanically selected. In still other embodiments, a more continuous selection of the mechanical positioning of sonar transducers 404 may be implemented, such as with a mechanical actuator that can be controlled. The mechanical actuators can include springs, brackets, screw drives, linear variable displacement transducers (LVDT), motors, gears, linkages, among other types of mechatronic actuation.

As shown in FIGS. 4A and 4B, underwater vessel 400-2 configured for ALS may result in increased hydrodynamic drag than underwater vessel 400-1 configured for SSS, due to the rotation of sonar transducers 404 to attain an azimuthal angle α less than 90°, for example. It is noted that the increased hydrodynamic drag condition of underwater vessel 400-2 is known and can be compensated by adjusting speed or other aspects of hydrodynamic behavior. In some embodiments, underwater vessel 400 may include a navigation control system that can correct or compensate for various hydrodynamical variations and conditions.

In underwater vessel 400, sonar signals from port-side and starboard side variable geometry sonar 402 may be received and processed independently of each other. For example, port-side and starboard side variable geometry sonar 402 may operate at different sonar frequencies that are known and are correlated to port-side and starboard-side. The frequency discrimination may be implemented by activating each of sonar transducers 404 (port and starboard sides) at different frequencies of emitted sonar. The frequency discrimination may be implemented as a spectral filter on sonar signals received by sonar transducers 404 (port and starboard sides). The spectral filler may be a low-pass, high-pass, or bandpass filler. In particular, where an area of insonification by port-side and starboard-side variable geometry sonar 402 overlaps, underwater vessel 400 may be enabled to identify and separate the respective sonar echoes from each individual variable geometry sonar 402 for processing and generating an image without ambiguity or additional noise. The overlapping insonification of port-side and starboard-side variable geometry sonar 402 may occur on the sea floor in front underwater vehicle 400 when ALS is used. In particular embodiments, both port-side and starboard-side variable geometry sonar 402 may be adapted to respectively or independently detect both sonar echoes that originate from both port-side and starboard-side variable geometry sonar 402, which may aid in detecting when sonar beams cross over a centerline associated with underwater vessel 400.

In one particular implementation, variable geometry sonar 402 may be used for supporting mine neutralization operations, such as MCM, which may be particularly suitable when underwater vessel 400 has a relatively small diameter (e.g., less than or equal to about 12 inches or 30 cm). Accordingly, underwater vessel 400 may be particularly suitable for MCM target detection and classification, and may provide substantial advantages for mine actuation and neutralization operations as compared with conventional sonar systems, due to the various features and functionality of variable geometry sonar 402, as described herein. In particular, variable geometry sonar 402. as described herein, may provide increased accuracy in identifying MCM targets and other positioning operations associated with MCM, as well as supporting the positioning of other autonomous neutralization vehicles.

In accordance with an embodiment of the present disclosure, a variable geometry sonar system cart enable an ALS mode of operation, such as described above with respect to underwater vessel 400. ALS may be enabled by extending sonar transducers 404 as shown in FIG. 4B and described previously.

For MCM operations, ALS may be used lo improve performance and efficiency, such as for the homing phase, as described previously. Specifically, underwater vessel 400 may be enabled lo activate the ALS mode of operation for the homing phase. For example, in the initial phase using SSS in the configuration of underwater vessel 400-1 shown in FIG. 4A, underwater vessel 400 may first localized the target. Then, underwater vessel 400 may return and start the homing phase for the target. At this point, the configuration of underwater vessel 400-2 shown in FIG. 4B may be used, such that sonar transducers 404 are geometrically positioned into the ALS mode, with the azimuth angle α of about 25° to about 45°. In one example, sonar transducers 404 may be mechanically actuated to extend lo any desired position, as shown in FIG. 4B. In some implementations of underwater vessel 400, sonar transducers 404 may be hinged at the forward end, and may swing out at the rear end. It is noted that various types of geometric arrangements and mechanical actuation may be used in different embodiments, such as a screw-drive type actuator.

In a low-cost or disposable embodiment, sonar transducers 404 may be spring loaded and enabled for mechanical release lo reach a position suitable for ALS to perform the homing phase. The spring loaded release of sonar transducers 404 may be preset lo a given azimuth angle α, such as 30° from the housing of underwater vessel 400, and with a 45° declination angle that may be the same as for SSS. When configured in the ALS mode for the homing phase, sonar transducers 404, as shown extended in FIG. 4B, result in increased hydrodynamic drag for underwater vessel 400. However, because the homing phase typically involves short ranges at reduced maneuvering speed, this increase in hydrodynamic drag may be an acceptable compromise.

Computer modeling of the ALS mode, such as shown in FIGS. 4A and 4B, augmented by data gathered during field tests of variable geometry sonar 402 conducted at sea, indicates that seamless sonar imaging of the sea floor is possible over a swath in front of the underwater vessel. In contrast, traditional SSS mode and SAS systems typically result in a gap in sonar imaging in the nadir region of the underwater vessel. For an underwater vessel with an ALS system, such as underwater vessel 400 as disclosed herein, operating at an altitude of 2-5 m above the sea floor, sonar imaging over at least 10 m across-track at a range of 5 m ahead may be performed seamlessly without gaps in coverage. The seamless sonar imaging enabled by the ALS mode is expected to enable the homing phase due to the smaller azimuth angle α that provides forward-looking imaging. The resolution of the ALS system, similar to sonar arrays 102 for SSS. may be sufficiently high due to a narrow beam width of sonar transducers 404. For the above ALS example, the spatial resolution is expected to be 10 cm along-track by 10 cm across-track. which may be sufficient to provide sharp sonar images with high contrast and good shadowing.

In various embodiments, underwater vessel 400 may provide other features associated with variable geometry sonar 402 that is enabled for SSS and for ALS. For example, underwater vessel 400 may be enabled to release a sonar payload comprising variable geometry sonar 402 for later recovery. When underwater vessel 400 is used for MCM neutralization, underwater vessel 400 may be controlled or programmed to release the sonar payload before an explosive charge (i.e., a mine being neutralized) is detonated. In this manner, the sonar payload may be made available for later recovery and reuse. For example, underwater vessel 400 may have variable geometry sonar 402 that is detachable and may be released for later recovery. In addition, underwater vessel 400 may further have al least one movable robotic arm that can be used to grasp and hold variable geometry sonar 402 that has been released, in order to use underwater vessel 400 for recovery and reuse of variable geometry sonar 402.

Figure 5A:
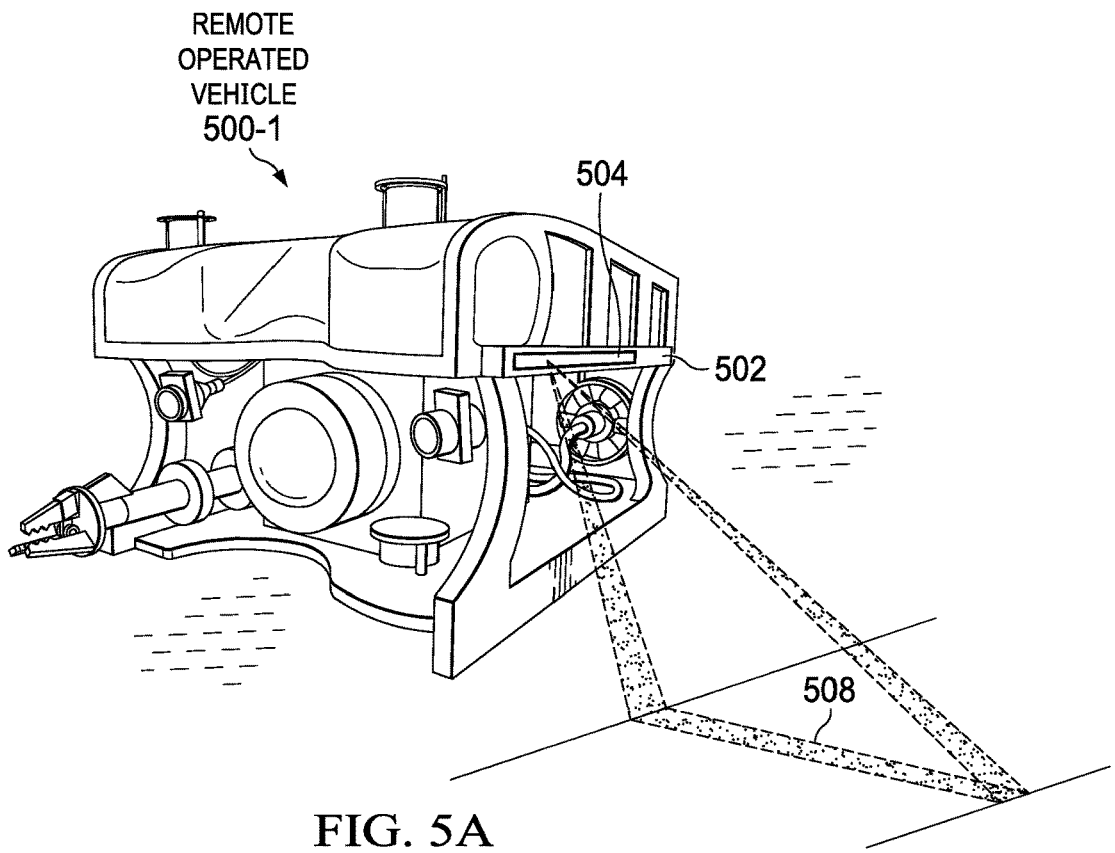
FIGS. 5A and 5B are depictions of a remote operated vehicle (ROV) having a variable geometry sonar array.
Figure 5B:
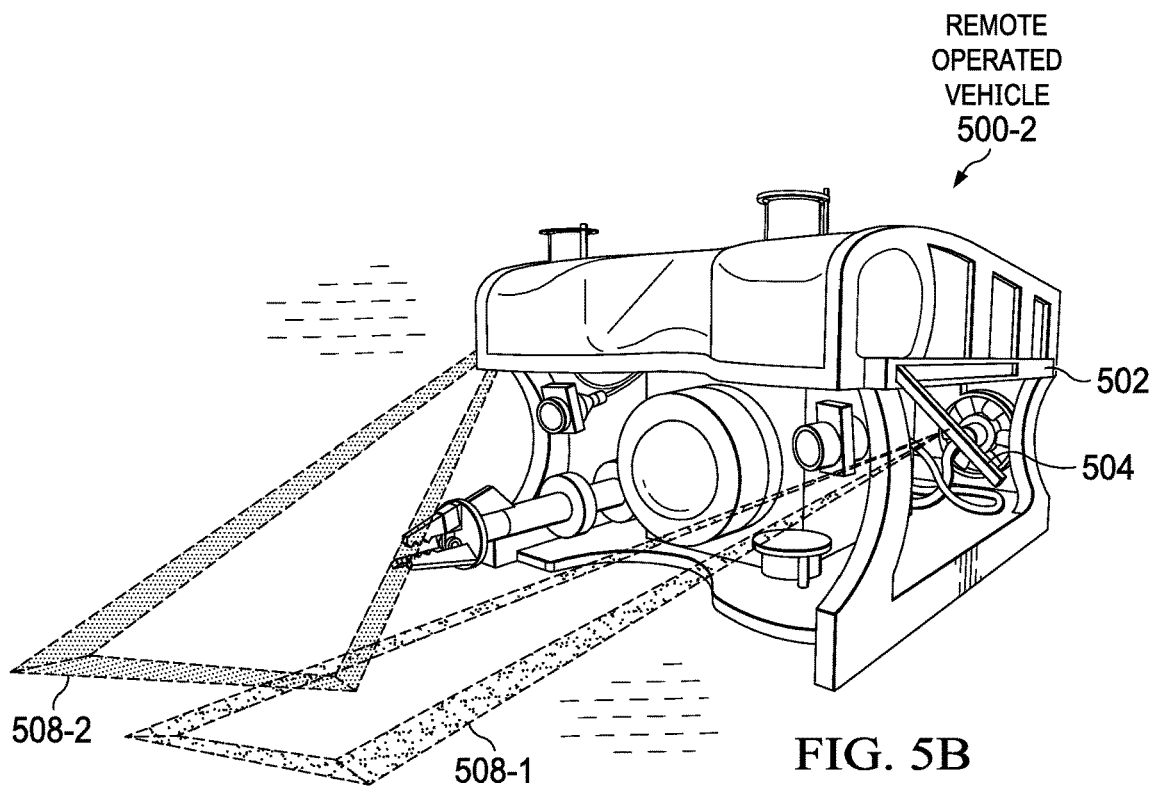

Referring now to FIGS. 5A and 5B, a remote operated vehicle (ROV) 500 is depicted having a variable geometry sonar 502 that is enabled for SSS and for ALS. ROV is depicted in a first configuration as ROV 500-1 in FIG. 5A and in a second configuration as ROV 500-2 in FIG. 5B. In various embodiments, ROV 500 may represent any of a variety of manned or unmanned submersible ROVs or submarines. The first configuration as ROV 500-1 in FIG. 5A may represent SSS mode, while the second configuration as ROV 500-2 in FIG. 5B may represent ALS mode, such as described above with respect to FIGS. 4A and 4B.

As shown in FIGS. 5A and 5B, ROV 500 may primarily be used for visual inspection with an optical camera, such as for underwater inspection of long stretches of a cable or a pipeline in front of ROV 500. However, in muddy or dark waters where the optical camera may be at least partially inoperable, variable geometry sonar 502 may be used for sonar imaging. For example, sonar transducers 504 of variable geometry sonar 502 may be used for SSS with ROV 500-1 to initially find the cable or the pipeline. Then, sonar transducers 504 of variable geometry sonar 502 may be used for ALS with ROV 500-2 along the cable or the pipeline for inspection purposes. As shown in FIG. 5B, a port-side ALS beam 508-1 and a starboard side ALS beam 508-2 may be generated using variable geometry sonar 502 on either side of ROV 500.

In various embodiments, sonar transducers 404, 504, or any of the sonar arrays disclosed herein, may comprise segmented sonar arrays, such as multichannel arrays with individual elements that produce a respective individual signal. The segmented multichannel sonar arrays may be enabled for tuning or directionality using phase modulation techniques. In some embodiments, the segmented multichannel sonar arrays may be arranged and an arc to perfectly coincide with a sonic focal point distance, with the radius of the are defined by the sonic focal point distance. In some embodiments, the sonic focal point distance may be electronically compensated for, such as using software post processing of the sonar echoes received from sonar transducers 404, 504, in order to tune the sonar imaging to a given sonar focal distance.

Figure 6:
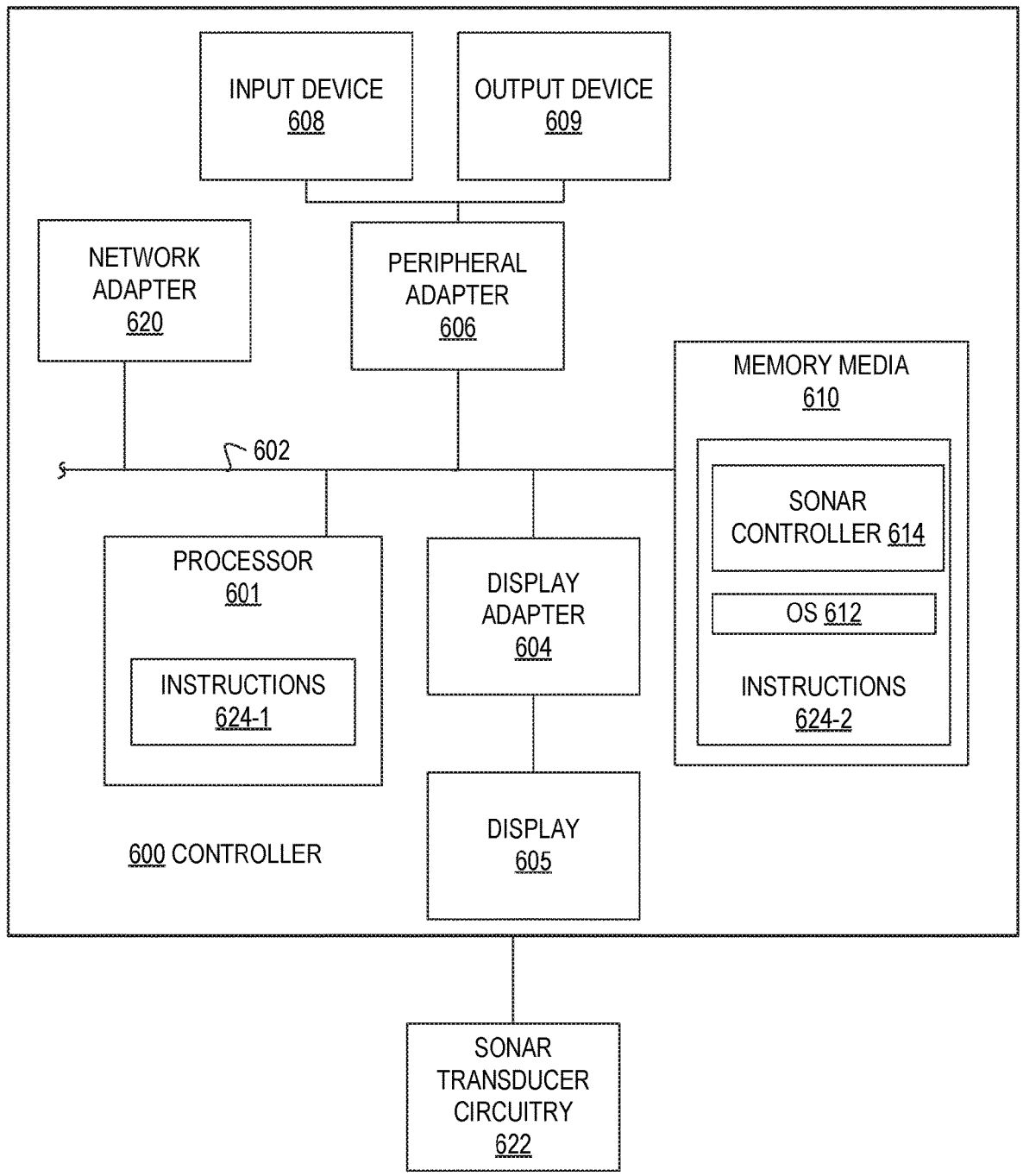
FIG. 6 is a depiction of an embodiment of a controller for a vessel having a variable geometry sonar array.

Referring now to FIG. 6, a block diagram illustrating selected elements of an embodiment of a controller 600 for controlling an underwater vessel according to the present disclosure. In various embodiments, controller 600 may be enabled to support a variable geometry sonar that is enabled for SSS and for ALS, as disclosed herein.

In the embodiment depicted in FIG. 6, controller 600 includes processor 601 coupled via shared bus 602 to storage media collectively identified as memory media 610.

Controller 600, as depicted in FIG. 6, further includes network adapter 620 that interfaces controller 600 to a network (not shown in FIG. 6). The network may enable controller 600 to communicate externally, such as with a tow vessel or a support vessel. In embodiments suitable for use with user interfaces, controller 600, as depicted in FIG. 6, may include peripheral adapter 606, which provides connectivity for the use of input device 608 and output device 609. Input device 608 may represent a device for user input, such as a keyboard or a mouse, or even a video camera. Output device 609 may represent a device for providing signals or indications to a user, such as loudspeakers for generating audio signals. It is noted that controller 600 may be used in embedded applications, without a user interface, such as a dedicated controller for underwater vessel 400, for example.

Controller 600 is shown in FIG. 6 including display adapter 604 and further includes a display device 605. Display adapter 604 may interface shared bus 602. or another bus, with an output port for one or more display devices, such as display device 605. Display device 605 may be implemented as a liquid crystal display screen, a computer monitor, a television or the like. Display device 605 may comply with a display standard for the corresponding type of display. Standards for computer monitors include analog standards such as video graphics array (VGA), extended graphics array (XGA), etc., or digital standards such as digital visual interface (DVI), definition multimedia interface (HDMI), among others. A television display may comply with standards such as NTSC (National Television System Committee), PAL (Phase Alternating Line), or another suitable standard. Display device 605 may include an output device 609, such as one or more integrated speakers to play audio content, or may include an input device 608, such as a microphone or video camera.

In FIG. 6, memory media 610 encompasses persistent and volatile media, fixed and removable media, and magnetic and semiconductor media. Memory media 610 is operable to store instructions, data, or both. Memory media 610 as shown includes sets or sequences of instructions 624-2, namely, an operating system 612 and a sonar controller 614. Sonar controller 614 may represent instructions executable by processor 601 to perform various operations, calculations, and processing associated with a variable geometry sonar that is enabled for SSS and for ALS, as disclosed herein. Operating system 612 may be a UNIX or UNIX-like operating system, a Windows® family operating system, or another suitable operating system. Instructions 624 may also reside, completely or at least partially, within processor 601 during execution thereof. It is further noted that processor 601 may be configured to receive instructions 624-1 from instructions 624-2 via shared bus 602.

Also shown with controller 600 in FIG. 6 is a sonar transducer circuitry 622 that represents interface circuitry used to operate various sonar transducers, such as sonar transducers 404, 504 described above, which may be piezoelectric sonar transducers. Accordingly, sonar transducer circuitry 622 may include electronic circuitry enabled to generate and a drive a particular waveform into sonar using the sonar transducers, such as digital signal processors (DSP), field programmable gale arrays (FPGA), analog to digital converters (DAC), power output circuitry, and high frequency high power amplifiers, among other components. Furthermore, sonar transducer circuitry 622 may include electronic circuitry enabled to receive and process sonar echoes, such as signal conditioning, instrumentation amplifiers, filters, digital to analog converters (DAC), as well as DSP, FPGA, or other processors for generating sonar images from the received sonar echoes. It is also noted that sonar transducer circuitry 622 may operate in conjunction with sonar controller 614 to seamlessly integrate various sonar echoes into coherent sonar images, and may also utilize various operational parameters of the underwater vessel, such as speed, heading, depth, location, orientation, among others. It is noted that sonar transducer circuitry 622 may also include a separate process and memory (not shown), similar to controller 600, that is enabled to execute various instructions associated with sonar imaging, as disclosed herein.

Figure 7:
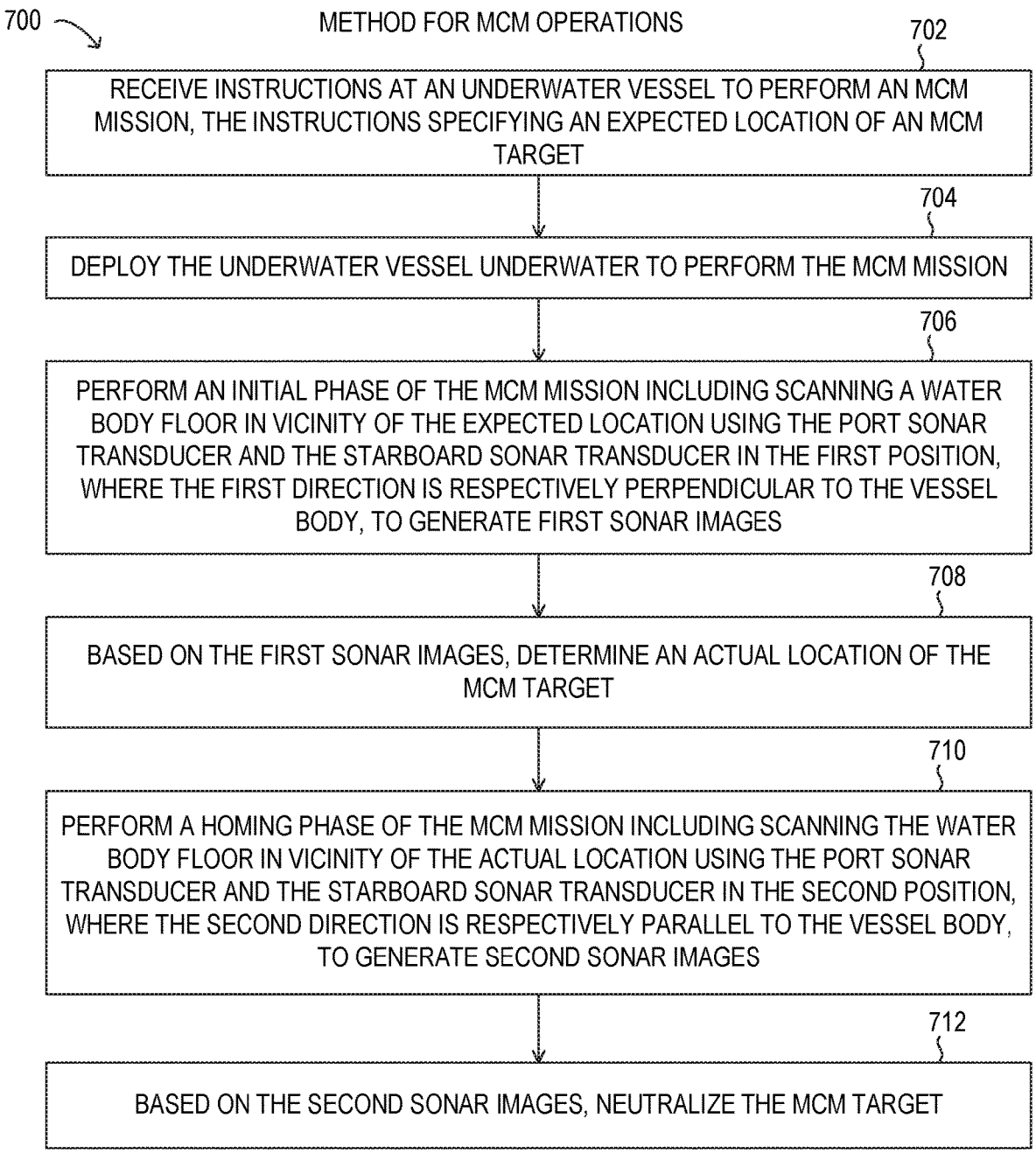
FIG. 7 is a flow chart depicting a method for MCM operations.

Referring now to FIG. 7, a flowchart of selected elements of an embodiment of a method 700 for MCM operations, as described herein, is depicted. Method 700 may be performed using underwater vessel 400, 500, as described above. It is noted that certain operations described in method 700 may be optional or may be rearranged in different embodiments.

Method 700 may begin at step 702 by receiving instructions at an underwater vessel to perform an MCM mission, the instructions specifying an expected location of an MCM target. At step 704, the underwater vessel is deployed underwater to perform the MCM mission. At step 706, an initial phase of the MCM mission is performed, including scanning a water body floor in vicinity of the expected location using the port sonar transducer and the starboard sonar transducer in the first position, where the first direction is respectively perpendicular to the vessel body, to generate first sonar images. Based on the first sonar images, at step 708, an actual location of the MCM target is determined. At step 710. a homing phase of the MCM mission is performed, including scanning the water body floor in vicinity of the actual location using the port sonar transducer and the starboard sonar transducer in the second position, where the second direction is respectively parallel to the vessel body, to generate second sonar images. Based on the second sonar images, at step 712, the MCM target is neutralized.

Referring now to FIG. 8, a flowchart of selected elements of an embodiment of a method 800 for sonar imaging, as described herein, is depicted. Method 800 may be performed using underwater vessel 400, 500, as described above. It is noted that certain operations described in method 800 may be optional or may be rearranged in different embodiments. Method 800 may begin at step 802 by actuating a port mechanical transducer and a starboard mechanical transducer to move from a first position to a second position. The first position may correspond to SSS, while the second position may correspond to ALS. At step 804, first circuitry enabled to drive at least one of the port sonar transducer or the starboard sonar transducer with a sonar waveform is controlled to insonify a first area that includes a nadir of the vessel. At step 806, second circuitry enabled to receive, from the port sonar transducer, a port sonar echo signal indicative of a port sonar echo from the first area is controlled. At step 808, second circuitry enabled to receive, from the starboard sonar transducer, a starboard sonar echo signal indicative of a starboard sonar echo from the first area is controlled. At step 810, second circuitry enabled to receive, from the starboard sonar transducer, a starboard sonar echo signal indicative of a starboard sonar echo from the first area is controlled. At step 812, second circuitry enabled 10 interpret the port sonar echo signal and the starboard sonar echo signal is controlled to generate an image of the first area, where the port sonar echo and the starboard sonar echo are reflected from the sonar waveform at the first area.

Figure 9:
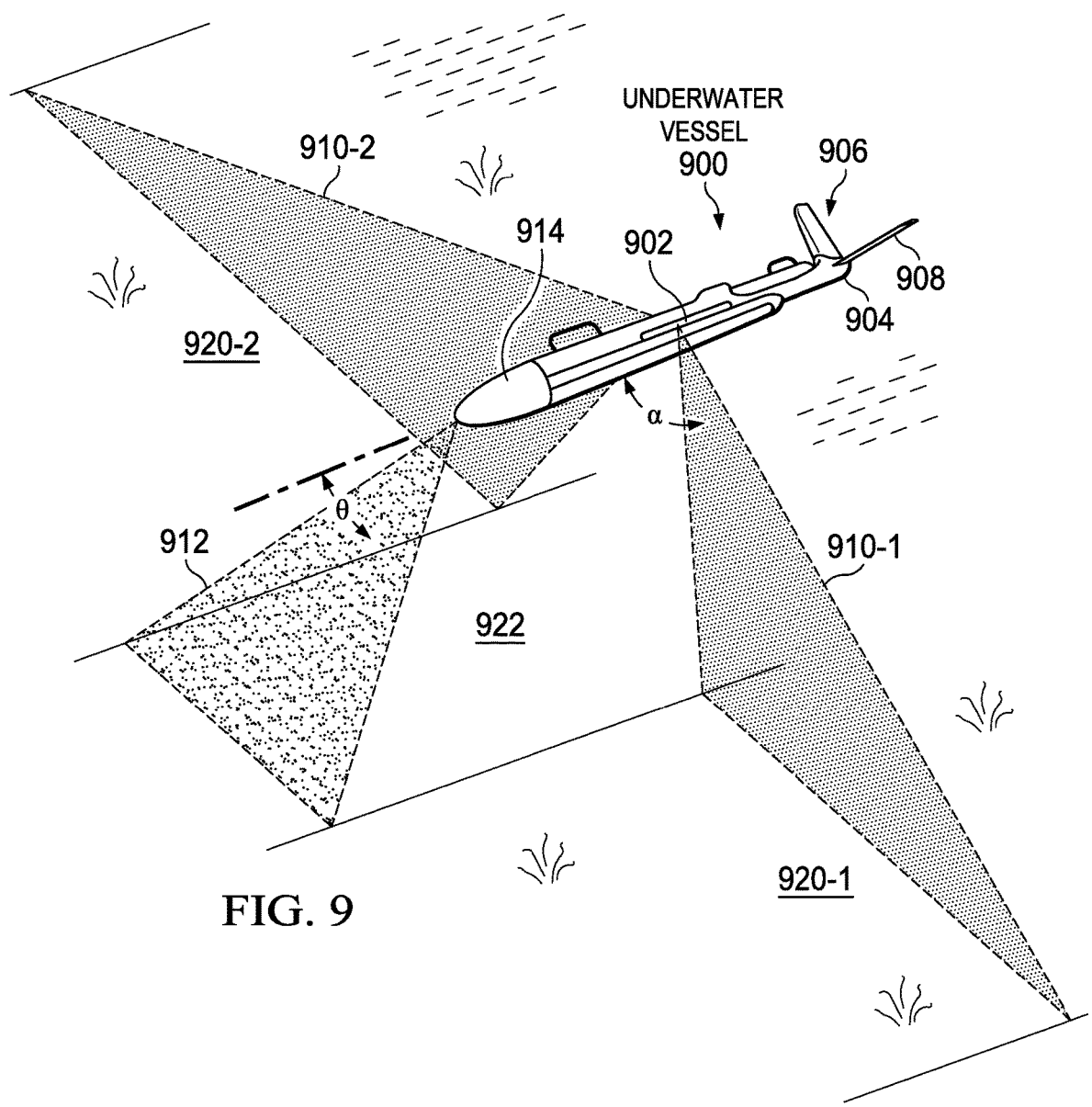
FIG. 9 is a depiction of a vessel having a combination of SSS and ALS sonar arrays.

FIG. 9 illustrates an underwater vessel 900 having a combination of sonar arrays. In various embodiments, underwater vessel 900 may be self-propelled or may be used as a tow body. Underwater vessel 900 may also be a UUV. Specifically, underwater vessel 900 is shown including an sonar arrays 902 for SSS and a nosecone sonar array 904 for ALS. The sonar arrays 904 for ALS are located proximal to a nosecone 914 of underwater vessel 900, such as on the surface of nosecone 914, or behind a cover of nosecone 914 of underwater vessel 900. The sonar arrays for sonar arrays 902 for SSS are shown in FIG. 9 located in a middle portion on the port side and the starboard side of underwater vessel 900. It is noted that various different geometries and locations for sonar arrays 902 for SSS and sonar arrays 904 for ALS may be used in various embodiments.

In FIG. 9, sonar arrays 902 for SSS may be used to insonify regions below and to the sides of underwater vessel 900. Specifically, on underwater vessel 900, a first SSS beam 910-1 insonifies a region 920-1 extending below and outwards on the port side, while a second SSS beam 910-2 insonifies a region 920-2 extending below and outwards on the port side. An azimuth angle α is defined as the angle between SSS beam 910 and the vessel body (or the forward direction of underwater vessel 900). It is noted that the azimuth angle α may be roughly perpendicular to a sonar emitting surface of sonar arrays 902 for SSS. Also, on underwater vessel 900, an ALS beam 912 emitted from nosecone 914 insonifies an area 922 that includes the nadir of underwater vessel 100 in a forward direction. Nosecone 914 may include an acoustically transparent cover that protects and enables sonar arrays 904 for ALS to be housed in nosecone 914. An inclination angle θ is defined as the angle between ALS beam 912 and the vessel body (or horizontal). For example, α may be about 60° while θ may be about 45° in some embodiments.

Sonar arrays 902 for SSS or sonar arrays 904 for ALS on underwater vessel 900 may be mounted in various locations with different arrangements, in addition to or alternatively from the locations described above. In some implementations, a sonar array may be mounted at various locations in tailfin section 906, such as on a tailfin 908. In particular, a lower tailfin on underwater vessel 900 may be used for installing a sonar array to insonify the sea bed. Various other types of underwater vessels or tow bodies may be used in other embodiments, including as described in further detail below.

Figure 10:
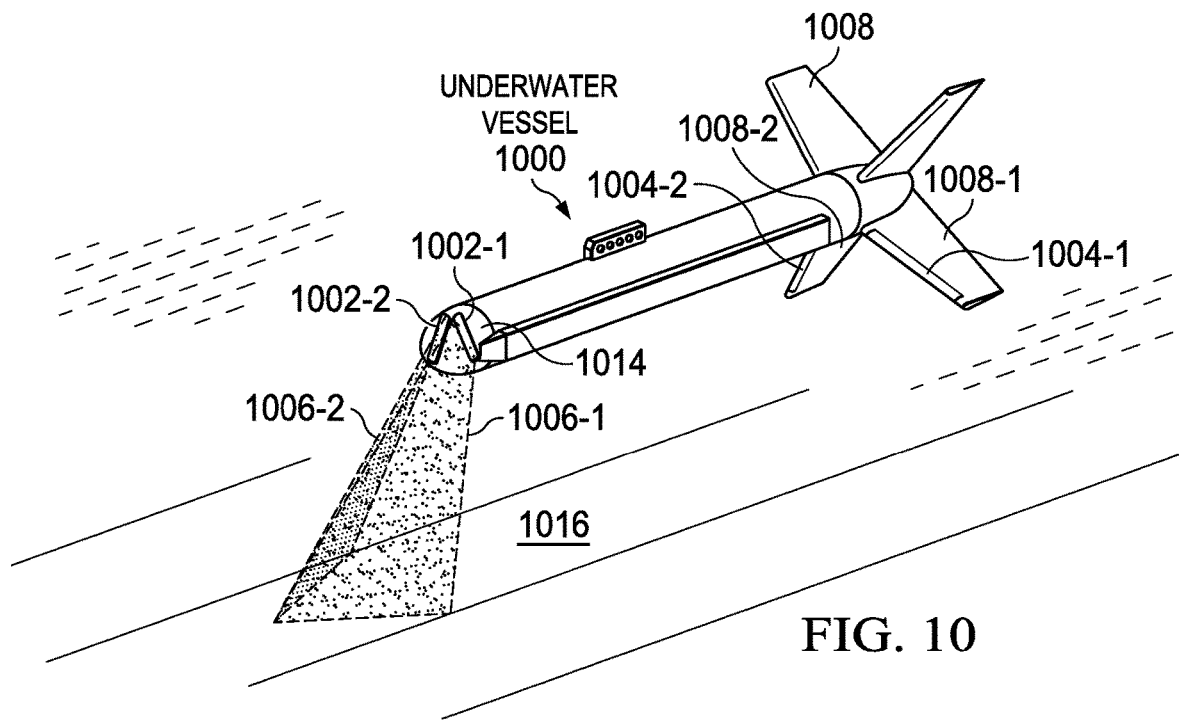
FIG. 10 is a depiction of a vessel having various ALS sonar arrays.

FIG. 10 illustrates an underwater vessel 1000 having a combination of sonar arrays. In various embodiments, underwater vessel 1000 may be self-propelled or may be used as a tow body. Underwater vessel 1000 may also be a UUV. Specifically, underwater vessel 1000 is shown including a first sonar array 1002 that is located at a nosecone 1014 of underwater vessel 1000. Also shown in FIG. 10 is a second sonar array 1004 that can be located on at least one tailfin 1008 of underwater body 1000. Specifically, second sonar array 1004 is shown comprising second sonar array 1004-1 on a port-side tailfin 1008-1 and second sonar array 1004-1 on a starboard side tailfin 1008-1.

In FIG. 10, when first sonar array 1002 is used as a transmitter, first sonar array 1002-1 generates a port beam 1006-1, while first sonar array 1002-2 generates a starboard beam 1006-2. As shown, beams 1006 insonify a nadir area 1016 underneath underwater vessel 1000. When first sonar array 1002 is used as a transmitter, second sonar array 1004 may be used as a receiver, since port beam 1006-1 and starboard beam 1006-2 are projected forwards to nadir area 1016 at a low angle of incidence, such that reflections from beams 1006 may be detected using second sonar arrays 1004 of underwater vessel 200. Also, as shown, second sonar array 1004 is comprised of second sonar array 1004-1 that may receive echoes from port beam 1006-1 reflected from nadir area 1016 and first sonar array 1004-2 that may receive echoes from starboard beam 1006-2 reflected from nadir area 1016.

Figure 11:
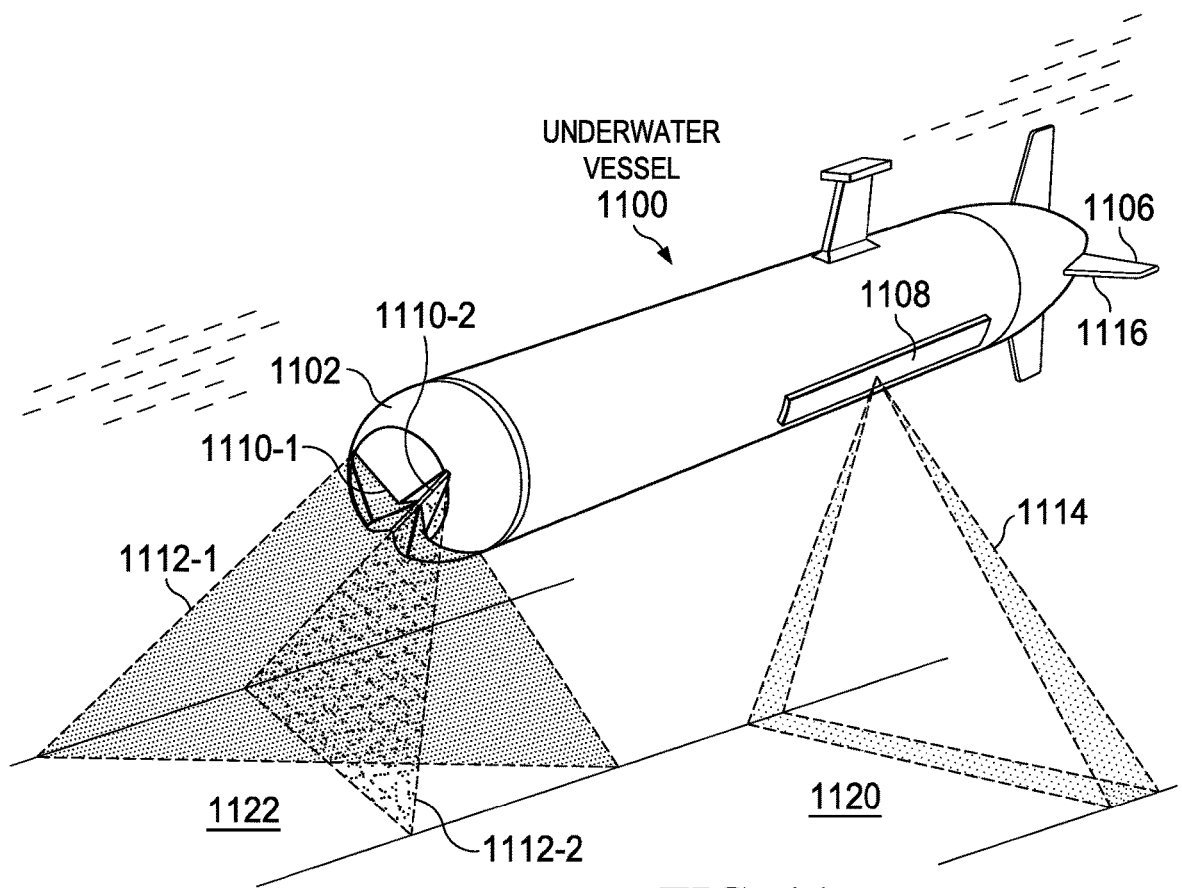
FIG. 11 is a depiction of a vessel having various ALS sonar arrays.

FIG. 11 illustrates an underwater vessel 1100 having a combination of sonar arrays. In various embodiments, underwater vessel 1100 may be self-propelled or may be used as a tow body. Underwater vessel 1100 may also be a UUV. Specifically, underwater vessel 1100 is shown including a sonar arrays 1108 for SSS and a nosecone 1102 incorporating a sonar array 1110 that functions as an ALS. As shown, sonar arrays 1110 for ALS are located at an external surface of nosecone 1102 of underwater vessel 1100. His noted that in various embodiments, the sonar arrays may be differently located, such as behind a cover (not shown) of nosecone 1102 of underwater vessel 1100. Sonar arrays 1108 for SSS are shown in FIG. 11 located in a middle portion on the port side and the starboard side of underwater vessel 1100 and insonify a port region 1120 of the sea bed as well as a corresponding starboard region of the sea bed (starboard side obscured from view in FIG. 11). It is noted that various different geometries and locations for sonar arrays 1110 for SSS and sonar arrays 1110 for ALS may be used in various embodiments.

In FIG. 11, nosecone 1102 may be particularly designed in shape and form to be used with sonar arrays 1110 for ALS. Specifically, nosecone 1102 may incorporate a surface design having two V-shaped channels that cross each other. Each V-shaped channel may have sonar array 1110 for ALS located therein. For example, a first sonar array 1110-1 may be located in a first V-shaped channel, while a second sonar array 1110-2 may be located in a second V-shaped channel. The geometry, location, and V-angle of the V-shaped channels may be variously designed in different implementations. For example, the V-shaped channels may be made of an acoustically reflective material that promotes propagation of sonar beams 1112 in a desired direction or amplitude or both. Also, nosecone 1102, and in particular the V-shaped channels at the surface thereof, may be designed in shape and form for a desired hydrodynamic performance, such as to enable a given velocity of underwater vessel 1100 in operation, for example.

In FIG. 11, when sonar array 1110 for ALS is used as a transmitter, first sonar array 1110-1 generates a first beam 1112-1, while second sonar array 1110-2 generates a second beam 1112-2. As shown, beams 1112 insonify a nadir area 1122 in front of and underneath underwater vessel 1100. Also shown in FIG. 11 is a third sonar array 1116 that can be located on at least one tailfin 1106 of underwater body 1000. Specifically, third sonar array 1116 is shown on tailfin 1106 that is a port-side tailfin. It will be understood that a similar tailfin arrangement may be used at a starboard side tailfin (not visible) with a corresponding starboard side fourth sonar array (obscured from view in FIG. 11) that can be used in conjunction with third sonar array 1116.

In FIG. 11, when sonar array 1110 for ALS is used as a transmitter, sonar array 1110 may also be used to receive the echoes from sonar beams 1112. In an alternate configuration, when sonar array 1110 for ALS is used as a transmitter, third sonar array 1116 may be used as a receiver for ALS of nadir area 1122, since sonar beams 1112 are projected forwards from nosecone 1102 to nadir area 1122 at a low angle of incidence, such that reflections from sonar beams 1112 may be detected using third sonar array 1116 (atone or both sides) of underwater vessel 1100.

Figure 12A:
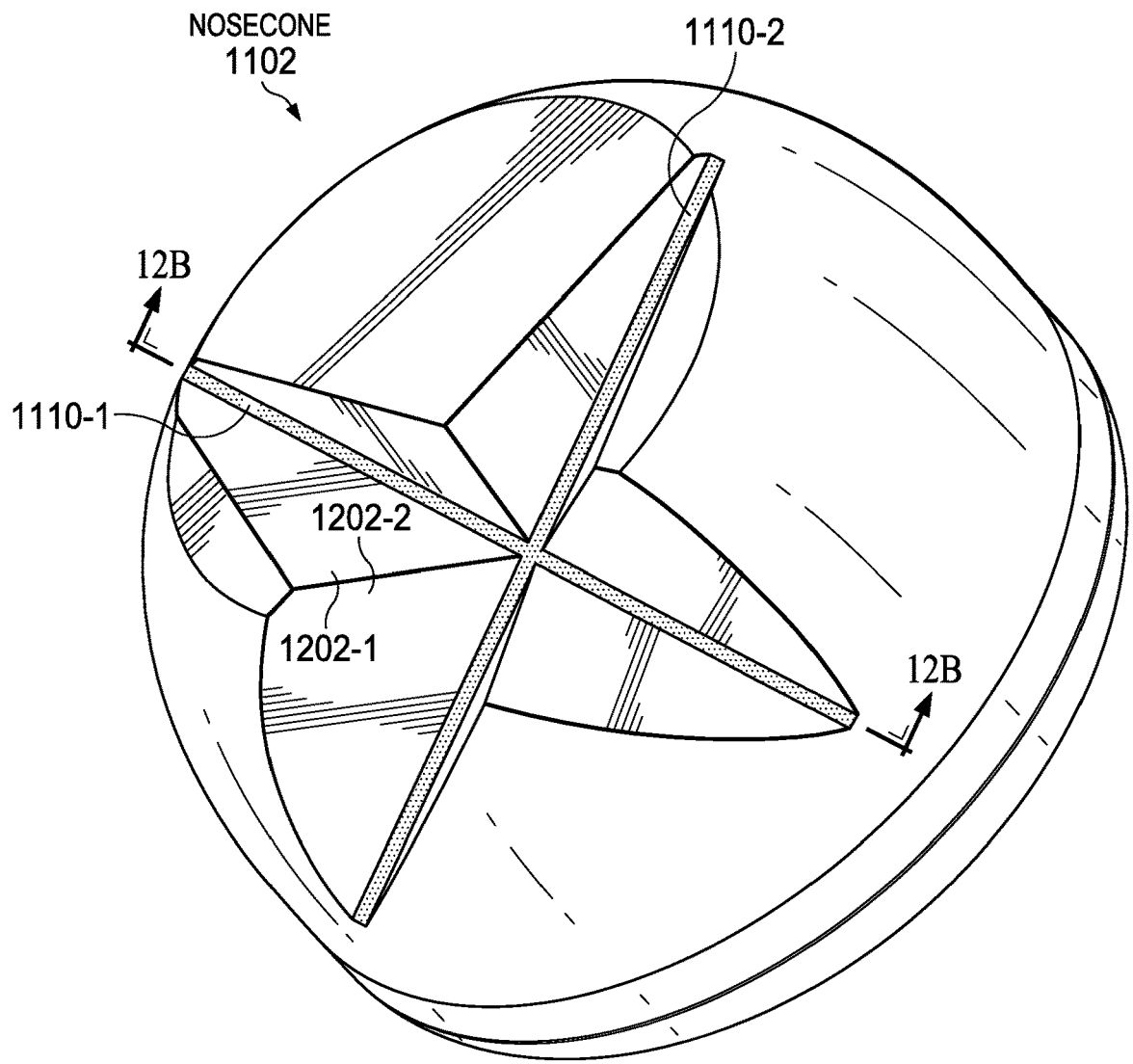
FIGS. 12A and 12B are depictions of a nosecone enabled for ALS.
Figure 12B:
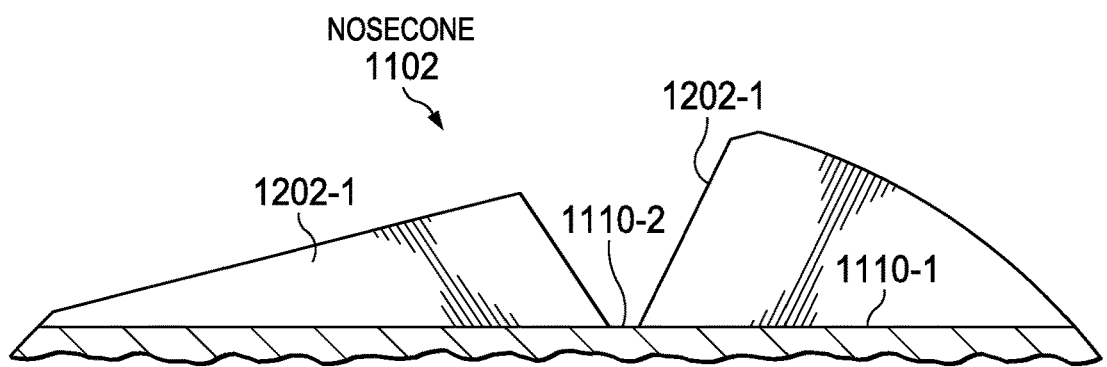

Referring now to FIGS. 12A and 12B, further details of nosecone 1102 enabled for ALS are shown in a perspective view and an elevational view, respectively. In the perspective view of FIG. 12A, V-shaped channels 1202 are shown as indentions in the surface of nosecone 1102, and a sectional line for the elevational view of FIG. 12B is also visible. In FIG. 12A, first sonar array 1100-1 is located at the bottom of a first V-shaped channel 1202-1, while second sonar array 1110-2 is located at the bottom of a second V-shaped channel 1202-2. In FIG. 12B, the elevational sectional view shows a cross-section of first V-groove 1202-1 as well as a side face of second V-groove 1202-2. In the particular implementation shown in FIGS. 11 and 12A, sonar arrays 1110 are arranged at or about 90° (perpendicular) to each other and intersect at a cross-point. For example, in particular embodiments, sonar array 1110-1 may be oriented at an angle between 80° and 100° with respect to each other. The cross-point may be offset from a longitudinal axis of nosecone 1102, such as below the longitudinal axis, for example, to better enable ALS directionality.

Figure 13:
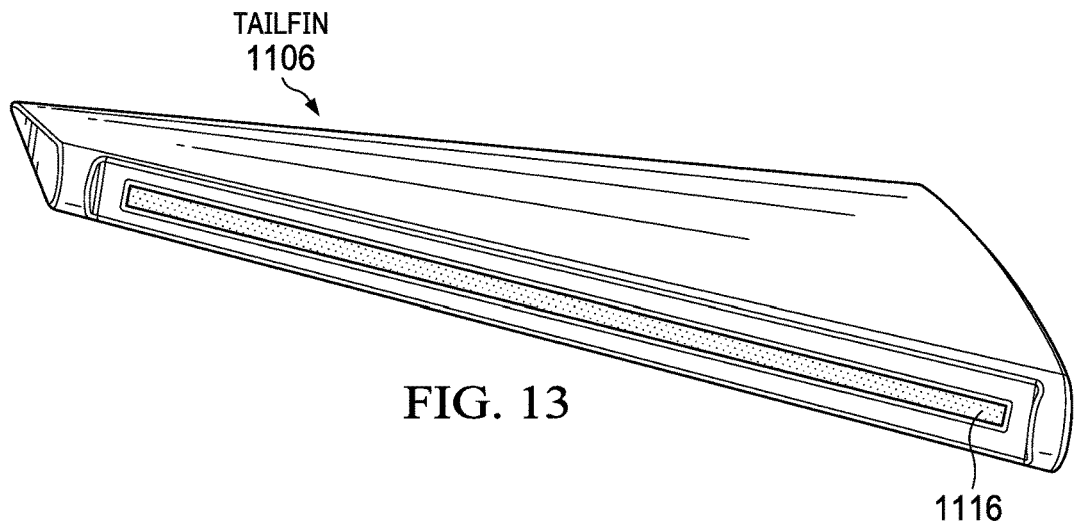
FIG. 13 is a depiction of a tailfin having an ALS sonar array.

In FIG. 13, further details of tailfin 1106 are shown in an enlarged view. As shown, tailfin 1106 may represent any of various tailfins shown and described herein, or otherwise used with UUVs, for example. In FIG. 13, third sonar array 1116 is shown incorporated at a leading edge of tailfin 1106. Accordingly, tailfins 1106 may be used to transmit a sonar beam, or to receive echoes from a transmitted sonar beam for sonar imaging.

Figure 14:
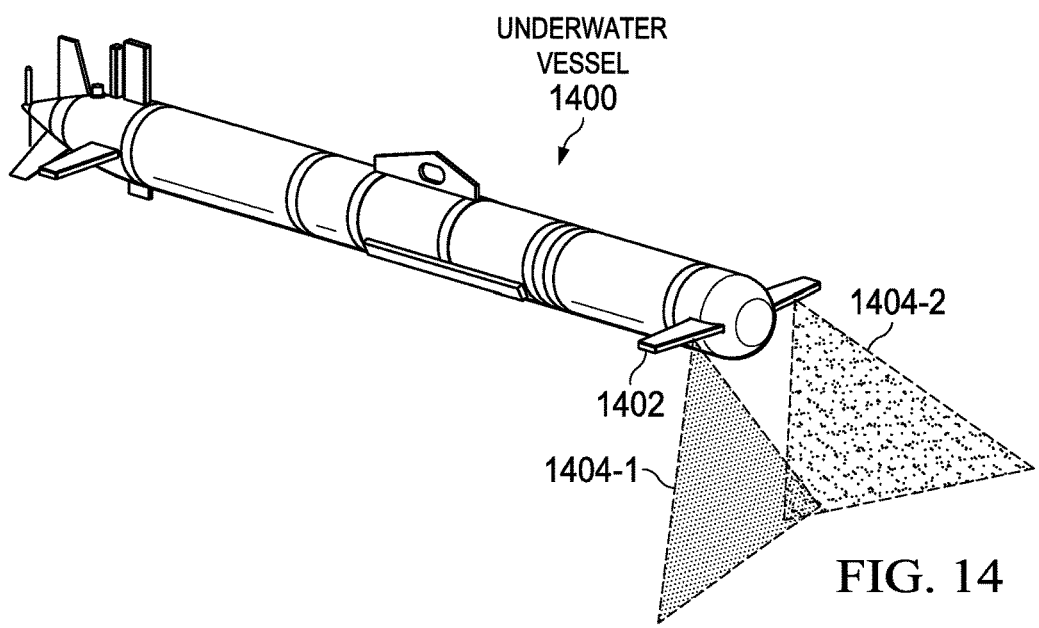
FIG. 14 is a depiction of a vessel having sidefin-mounted ALS sonar arrays.

FIG. 14 illustrates an underwater vessel 1400 having a combination of sonar arrays. In various embodiments, underwater vessel 1400 may be self-propelled or may be used as a tow body. Underwater vessel 1400 may also be a UUV. Specifically, underwater vessel 1400 is shown including front sidefins 1402 having corresponding sonar arrays located thereon. For example, front sidefins 1402 may be similar to tailfin 1106 described above with respect to FIG. 13 and may respectively operate in a similar manner on the port side to generate port beam 1404-2 and on the starboard side to generate starboard beam 1404-1 that can function as an ALS. It is noted that in various embodiments, underwater vessel 1400 may further include an SSS (not shown in FIG. 14), such as in a middle portion on the port side and the starboard side of underwater vessel 1400. In operation, front sidefins 1402 may serve as transmitter/receivers or as transmitters when used in conjunction with another set of receiver arrays, such as depicted in the sidefins of FIGS. 15-17 below or as otherwise disclosed herein.

Figure 15:
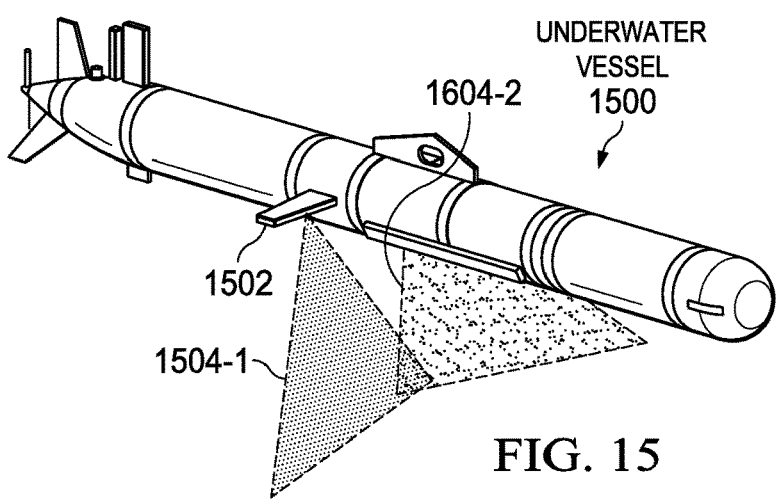
FIG. 15 is a depiction of a vessel having sidefin-mounted ALS sonar arrays.

FIG. 15 illustrates an underwater vessel 1500 having a combination of sonar arrays. In various embodiments, underwater vessel 1500 may be substantially similar to underwater vessel 1400 described above with respect to FIG. 14. In FIG. 15, underwater vessel 1500 is shown having middle sidefins 1502 that may be located on both sides at a midsection of underwater vessel 1500 (port side is obscured from view in FIG. 15). Accordingly, middle sidefins 1502 may respectively operate in a similar manner as front sidefins 1402 (see FIG. 14) on the port side to generate port beam 1504-2 and on the starboard side to generate starboard beam 1504-1 that can function as an ALS. In operation, middle sidefins 1502 may serve as transmitter/receivers, as transmitters when used in conjunction with another set of receiver arrays, or as receivers when used with another transmitter, such as transmitting front sidefins 1402, for example, depicted in FIG. 14 above, or with another transmitter, as otherwise disclosed herein.

Figure 16:
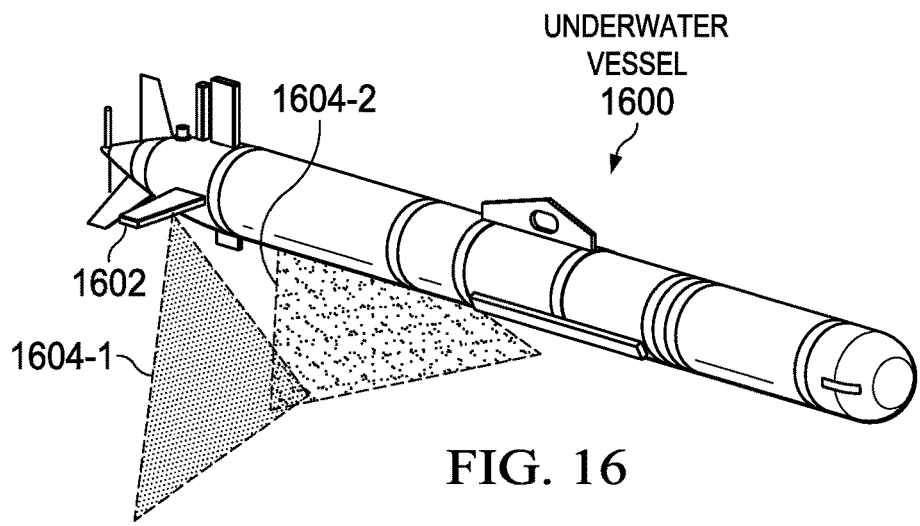
FIG. 16 is a depiction of a vessel having sidefin-mounted ALS sonar arrays.

FIG. 16 illustrates an underwater vessel 1600 having a combination of sonar arrays. In various embodiments, underwater vessel 1600 may be substantially similar to underwater vessel 1400 described above with respect to FIG. 14. In FIG. 16, underwater vessel 1600 is shown having rear sidefins 1602 that may be located on both sides at a midsection of underwater vessel 1600 (port side is obscured from view in FIG. 16). Accordingly, rear sidefins 1602 may respectively operate in a similar manner as front sidefins 1402 (see FIG. 14) on the port side to generate port beam 1604-2 and on the starboard side to generate starboard beam 1604-1 that can function as an ALS. In operation, rear sidefins 1602 may serve as transmitter/receivers, as transmitters when used in conjunction with another set of receiver arrays, or as receivers when used with another transmitter, such as transmitting front sidefins 1402, for example, depicted in FIG. 14 above, or with another transmitter, as otherwise disclosed herein.

Figure 17:
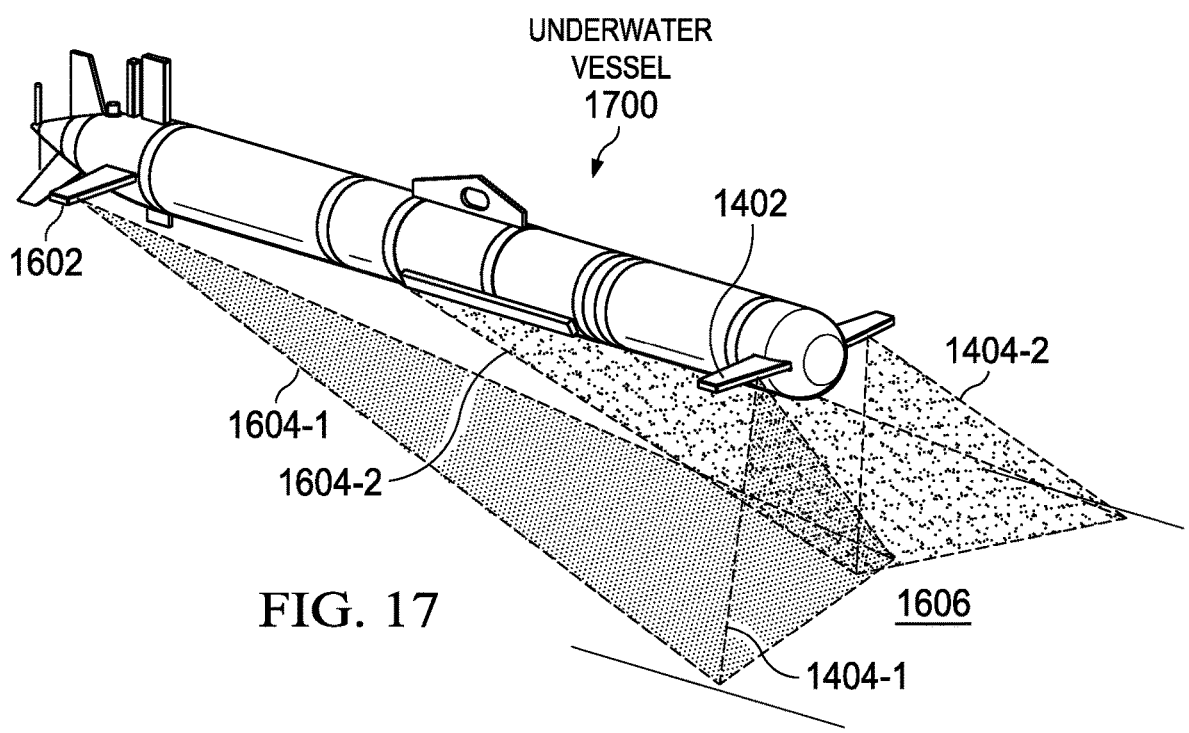
FIG. 17 is a depiction of a vessel having sidefin-mounted ALS sonar arrays.

FIG. 17 illustrates an underwater vessel 1700 having a combination of sonar arrays. In various embodiments, underwater vessel 1700 may be substantially similar to underwater vessel 1400 described above with respect to FIG. 14. In FIG. 17, underwater vessel 1700 is shown having front sidefins 1402 and rear sidefins 1602. In the depicted configuration of FIG. 17, front sidefins 1402 may operate as transmitters to emit port sonar beam 1404-2 and starboard sonar beam 1404-1. Upon reflection by the sea bed at an area 1606 that includes the nadir beneath underwater vessel 1700, port sonar beam 1404-2 may reflect port echo 1604-2, while starboard sonar beam 1404-1 may reflect starboard echo 1604-1. Accordingly, echoes 1604 may reflect back to rear sidefins 1602 operating as receivers to generate the sonar image of area 1606 as underwater vessel 1700 moves in a forward direction.

As disclosed herein, a sonar system and method enable performing angled-looking sonar (ALS) by emitting sonar waves in a forward and downward direction from sonar transducers located at an underwater vessel. The sonar waves may be received by sonar transducers located at the underwater vessel. Additionally, a variable geometry sonar system and method may enable performing side scan sonar (SSS) and ALS by moving at least one sonar transducer. The variable geometry sonar system may be used with an underwater vessel to perform mine countermeasure (MCM) missions by using ALS for a homing phase on a target.

While the present disclosure has been shown and described with respect to various embodiments, it is noted from the foregoing description that various changes, modifications, and variations may be made thereto without departing from the spirit and scope of the invention as set forth in the claims. For example, it is noted that the foregoing description and figures generally depict (among other things) a vessel with a variable geometry sonar system as a UUV, but the foregoing disclosure applies to other types of vessels, vehicles, or facilities, fixed or moving, as well. Similarly, it is noted that the vessels and sonar systems illustrated and described herein may have a different numbers of receiving and transmitting sonar arrays or transducers. Some or all of the sonar arrays or transducers may be located in one or more positions on or near a vessel or other structure that is or are different from those illustrated and described in the foregoing disclosure, which are intended as examples. Hence, the embodiments and specific dimensions, materials, locations, uses and operations, and the like described above are merely illustrative and do not limit the scope of the invention or the claims herein.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A vessel for underwater sonar imaging, the vessel comprising:
a vessel body having a longitudinal axis and having a nosecone and at least two tailfins, including a port tailfin and a starboard tailfin, wherein the vessel body is configured to move underwater along the longitudinal axis;
a port sonar transducer located at the nosecone;
a starboard sonar transducer located at the nosecone;
a port tailfin sonar transducer located at the port tailfin;
a starboard tailfin sonar transducer located at the starboard tailfin;
wherein the port sonar transducer and the starboard sonar transducer are configured to insonify a downward direction with respect to the vessel body;
wherein the port tailfin sonar transducer is configured to receive a port sonar echo from the port sonar transducer;
wherein the starboard tailfin sonar transducer is configured to receive a starboard sonar echo from the starboard sonar transducer; and
wherein the port sonar transducer and the starboard sonar transducer are each configured to insonify the downward direction with respect to the vessel body at a declination angle with respect to the longitudinal axis of between 30 and 60 degrees and an azimuth angle with respect to the longitudinal axis of between 25 and 45 degrees, wherein the port sonar transducer and the starboard sonar transducer are each configured to move between a first position to isonify a first direction and a second position to isonify a second direction within these declination and azimuth angle ranges.

2. The vessel of claim 1, wherein the downward direction extends below and ahead of the vessel body.

3. The vessel of claim 1, further comprising:
a port side sonar transducer located at the port side; and
a starboard side sonar transducer located at the starboard side.

4. The vessel of claim 1, wherein the vessel is an unmanned underwater vessel.

5. The vessel of claim 1, wherein the vessel is a tow body.

6. The vessel of claim 1, wherein the vessel is configured for autonomous operation.

7. The vessel of claim 1, further comprising:
first circuitry configured to drive at least one of the port sonar transducer or the starboard sonar transducer with a sonar waveform to insonify a first area; and
second circuitry configured to:
receive, from the port tailfin sonar transducer, a port sonar echo signal indicative of the port sonar echo from the first area;
receive, from the starboard sonar transducer, a starboard sonar echo signal indicative of the starboard sonar echo from the first area; and
process the port sonar echo signal and the starboard sonar echo signal to generate an image of the first area, wherein the port sonar echo and the starboard sonar echo are reflected from the sonar waveform at the first area.

8. The vessel of claim 7, wherein the vessel is a tow body.

9. A vessel for underwater sonar imaging, the vessel comprising:
a vessel body having a longitudinal axis and a nosecone, wherein the vessel body is configured to move underwater along the longitudinal axis;
a first sonar transducer located at the nosecone;
a second sonar transducer located at the nosecone;
wherein the first sonar transducer and the second sonar transducer are configured to insonify a downward direction with respect to the vessel body; and
wherein the first sonar transducer and the second sonar transducer are each configured to insonify the downward direction with respect to the vessel body at a declination angle with respect to the longitudinal axis of between 30 and 60 degrees and an azimuth angle with respect to the longitudinal axis of between 25 and 45 degrees, wherein the first sonar transducer and the second sonar transducer are each configured to move between a first position to isonify a first direction and a second position to isonify a second direction within these declination and azimuth angle ranges.

10. The vessel of claim 9, wherein the first sonar transducer and the second sonar transducer are segmented transducers that include a plurality of individual sonar channels.

11. The vessel of claim 9, wherein the first sonar transducer and the second sonar transducer are oriented along a curve having a focal point corresponding to a radius of the curve.

12. The vessel of claim 9, wherein the first sonar transducer and the second sonar transducer are exposed at the nosecone.

13. The vessel of claim 9, wherein the first sonar transducer and the second sonar transducer are located internal to the nosecone, wherein the nosecone further comprises a cover enabled configured to transmit sonar waves.

14. The vessel of claim 9, wherein the first sonar transducer and the second sonar transducer are oriented at an angle between 80° and 100° with respect to each other.

15. The vessel of claim 14, wherein the nosecone further comprises a first V-shaped channel containing the first sonar transducer and a second V-shaped channel containing the second sonar transducer.

16. The vessel of claim 15, wherein the first V-shaped channel and the second V-shaped channel are configured to direct sonar waves respectively emitted by the first sonar transducer and the second sonar transducer.

17. The vessel of claim 9, further comprising:
a port side sonar transducer located at a port side; and
a starboard side sonar transducer located at a starboard side.

18. The vessel of claim 9, wherein the vessel is an unmanned underwater vessel.

19. The vessel of claim 9, wherein the vessel is configured for autonomous operation.

\* \* \* \* \*